(12) United States Patent
Liang et al.

(10) Patent No.: US 12,355,384 B2
(45) Date of Patent: Jul. 8, 2025

(54) ACOUSTIC NOISE REDUCTION FOR SWITCHED RELUCTANCE MACHINES

(71) Applicant: Enedym Inc., Hamilton (CA)

(72) Inventors: Jianbin Liang, Hamilton (CA); Berker Bilgin, Welland (CA)

(73) Assignee: Enedym Inc, Hamilton (CA)

( * ) Notice: Subject to any disclaimer, the term of this patent is extended or adjusted under 35 U.S.C. 154(b) by 0 days.

(21) Appl. No.: 18/269,819

(22) PCT Filed: Mar. 2, 2023

(86) PCT No.: PCT/CA2023/050268
§ 371 (c)(1),
(2) Date: Jun. 27, 2023

(87) PCT Pub. No.: WO2023/201412
PCT Pub. Date: Oct. 26, 2023

(65) Prior Publication Data
US 2025/0096716 A1 Mar. 20, 2025

Related U.S. Application Data

(60) Provisional application No. 63/332,903, filed on Apr. 20, 2022.

(51) Int. Cl.
  *H02K 21/00* (2006.01)
  *H02P 25/089* (2016.01)
  *H02P 29/50* (2016.01)

(52) U.S. Cl.
  CPC ............ *H02P 29/50* (2016.02); *H02P 25/089* (2016.02)

(58) Field of Classification Search
  CPC ........ H02P 29/50; H02P 27/08; H02P 29/098; H02P 25/08; H02P 29/052
  See application file for complete search history.

(56) References Cited

U.S. PATENT DOCUMENTS

| 9,991,837 B2 | 6/2018 | Vaks et al. |
| 10,199,976 B2 | 2/2019 | Vaks et al. |

(Continued)

FOREIGN PATENT DOCUMENTS

CN 111064413 A * 4/2020

OTHER PUBLICATIONS

Gundogmus et al., "Direct Acceleration Harmonic Control with Current Harmonics Injection Method to Reduce Acoustic Noise and Vibration in Switched Reluctance Machines", 2021 IEEE Energy Conversion Congress and Exposition (ECCE), Oct. 14, 2021, pp. 3922-3927.

(Continued)

*Primary Examiner* — Karen Masih

(57) ABSTRACT

The current profile of excitation current provided to the electrical coils of a switched reluctance machine is controlled to reduce acoustic noise. A plurality of potential current waveforms can be evaluated to select a desired waveform that reduces the acoustic noise level of the switched reluctance machine. A cumulative sound pressure level of the switched reluctance machine can be determined for each potential current waveform. The cumulative sound pressure level can be determined based on a plurality of harmonic sound pressure levels expected to result from the potential current waveform. A desired current waveform can be identified as the potential current waveform associated with an optimal cumulative sound pressure level. The desired current waveform can then be applied to the corresponding phase coil of the switched reluctance machine in order to operate the switched reluctance machine while reducing acoustic noise without sacrificing other motor performance metrics.

17 Claims, 15 Drawing Sheets

(56) References Cited

U.S. PATENT DOCUMENTS

| | | | |
|---|---|---|---|
| 10,530,229 | B2 | 1/2020 | Bilgin et al. |
| 10,615,676 | B2 | 4/2020 | Bilgin et al. |

OTHER PUBLICATIONS

International Search Report (ISR) and Written Opinion (WO) in PCT/CA2023/050268 mailed May 25, 2023.

B. Bilgin, B. Howey, A. D. Callegaro, J. Liang, M. Kordic, J. Taylor, and A. Emadi, "Making the case for switched reluctance motors for propulsion applications," IEEE Transactions of Vehicular Technology, vol. 69, No. 7, Jul. 2020.

J. W. Jiang, and J. Liang, "Fundamentals of vibrations and acoustic noise," in Switched Reluctance Motor Drives: Fundamentals to Applications, Boca Raton, FL: CRC Press, 2018.

J. W. Jiang, J. Liang, J. Dong, B. Howey, and A. D. Callegaro, "Noise and vibration in switched reluctance machines," in Switched Reluctance Motor Drives: Fundamentals to Applications, Boca Raton, FL: CRC Press, 2018.

J. Furqani, M. Kawa, K. Kiyoya, and A. Chiba, "Comparison of current waveforms for noise reduction in switched reluctance motors," in Proc. IEEE Energy Conversion Congress and Expo, Cincinnati, OH, USA, 2017, pp. 752-759.

A. Hofmann, A. Al-Dajani, M. Bosing, and R. W. D. Doncker, "Direct instantaneous force control: A method to eliminate mode-0-borne noise in switched reluctance machines," in Proc. IEEE International Electric Machines and Drives Conference, Chicago, IL, USA, May 2013, pp. 1009-1016.

Z. Q. Zhu, X. Liu, and Z. Pan, "Analytical model for predicting maximum reduction levels of vibration and noise in switched reluctance machine by active vibration cancellation," IEEE Transactions on Energy Conversion, vol. 26, No. 1, pp. 36-45, Mar. 2011.

A. Tanabe and A. Akatsu, "Vibration reduction in SRM with a smoothing voltage commutation by PWM," in Proc. 9th International Conference on Power Electronics/ECCE Asia, Seoul, South Korea, Jun. 2015, pp. 600-604.

A. D. Callegaro, B. Bilgin, and A. Emadi, "Radial force shaping for acoustic noise reduction in switched reluctance machines," IEEE Transactions on Power Electronics, vol. 34, No. 10, pp. 9866-9878, Oct. 2019.

B. Howey and H. Li, "Operational principles and modeling of switched reluctance machines," in Switched Reluctance Motor Drives: Fundamentals to Applications, Boca Raton, FL: CRC Press, 2018.

A. D. Callegaro, J. Liang, J. W. Jiang, B. Bilgin, and A. Emadi, "Radial force density analysis of switched reluctance machines: The source of acoustic noise," IEEE Transactions on Transportation Electrification, vol. 5, No. 1, pp. 93-106, Mar. 2019.

U.S. Department of Energy, Advanced manufacturing office, premium efficiency motor selection and application guide—A handbook for industry, Feb. 2014. [Online]. Available: http://www.energy.gov/.

U.S. Energy Information Administration, Annual energy outlook 2016 with projections to 2040, Aug. 2016. [Online]. Available: http://www.eia.gov/.

P. Waide and C. U. Brunner, Energy-efficiency policy opportunities for electric motor-driven systems, International Energy Agency Working Paper, 2011.

B. Bilgin and A. Emadi, "Electric motors in electrified transportation: A step towards achieving a sustainable and highly efficient transportation system," IEEE Power Electronics Magazine, vol. 1, No. 2, pp. 10-17, 2014.

F. Momen, K. Rahman, and Y. Son, "Electrical propulsion system design of Chevrolet Bolt battery electric vehicle," IEEE Transactions on Industrial Applications, vol. 55, No. 1, pp. 376-384, 2019.

B. Bilgin and A. Emadi, "Electric motor industry and switched reluctance machines," in Switch Reluctance Motor Drives: Fundamentals to Applications, Boca Raton, FL: CRC Press, 2018.

D. N. Ionel, "High-efficiency variable-speed electric motor drive technologies for energy savings in the U.S. residential sector," in Proc. 12th Intern. Conf. Opt. Elec. Electr. Equip., Moeciu Brasoc Country, 2010.

U.S. Department of Energy, Critical Materials Strategy. Dec. 2011. [Online]. Available: http://energy.gov/.

United States Geological Survey (USGS). 2014 Mineral Yearbook, Rare Earths [Advanced Release], Dec. 2016, Available: http://www.usgs.gov/.

Technology Metals Research, Rare Earth Market Outlook Report. [Online]. Available: http://www.techmetalsresearch.com/.

Liang, "Acoustic noise and vibrations in switched reluctance motors: enhanced modeling," Ph.D. Dissertation, McMaster University, 2019.

* cited by examiner

Mode 0, 6075 Hz

Mode 6, 5895 Hz

ACOUSTIC NOISE REDUCTION FOR SWITCHED RELUCTANCE MACHINES

CROSS-REFERENCE TO RELATED APPLICATIONS

This application is a national phase entry of PCT/CA2023/050268 filed Mar. 2, 2023 (which designates in the U.S.), which claims priority from U.S. Provisional Patent Application Ser. No. 63/332,903 filed on Apr. 20, 2022, the entirety of which is incorporated herein by reference.

FIELD OF THE INVENTION

The described embodiments relate generally to switched reluctance machines, and in particular, to reducing acoustic noise in switched reluctance machines (SRMs).

BACKGROUND

Electric machines have been applied as motors and generators in a wide range of industries for more than a century. Electric motors are a large consumer of electrical energy with around 46% of global electricity demand coming from electric motors (see e.g. U.S. Department of Energy, Advanced manufacturing office, premium efficiency motor selection and application guide—A handbook for industry, February 2014. [Online]. Available: http://www.energy.gov/). Motor-related electrical energy consumption is expected to increase in the coming decades, for instance due to higher penetration of electrified vehicles into the market, accelerating use of renewable energy systems, increasing sales of household appliances in jurisdictions with a growing middle class, and growing need for cooling equipment in regions that face significant temperature rise due to climate change. There is an ever-increasing demand for high-efficiency, high-performance, and low-cost electric motors for various applications in the transportation sector (e.g. propulsion motors), the industrial sector (e.g. pumps), the commercial sector (e.g. compressors), the residential sector (e.g. fans), and the energy generation sector (e.g. wind turbines).

Rare earth magnets are heavily utilized in various motor applications. The manufacturing of permanent magnets represents the largest use of rare earth metals. Rotor magnets in permanent magnet (PM) machines provide an independent source of magnetic flux. Interior permanent magnet machines with magnets are embedded in the rotor are currently used in a majority of electrified powertrain applications. Surface permanent magnet machines where magnets are located on the surface of the rotor are being increasingly used for residential applications. However, price volatility and supply chain risks relating to rare earth metals may limit the availability of permanent magnet motors. In addition, the extraction and processing of rare earth metals has adverse effects on the environment. Challenges with the supply of rare earth metals may prevent the electric motor industry from responding to the increasing demand for high-efficiency, high-performance, and low-cost electric motors.

A reluctance machine is an electric machine in which torque is produced by the tendency of the movable part of the machine to move into a position where the inductance of an excited winding is maximized. A switched reluctance machine (SRM) is a type of a reluctance machine where the windings are energized as a function of the position of the movable part of the machine. A SRM has salient poles on both the rotor and the stator. SRMs can omit permanent magnets.

SRMs are suitable for many applications, including traction and automotive applications due to their simple and low-cost construction and robustness. However, SRMs can have high acoustic noise and vibration, which can impede the use of SRMs in noise-sensitive applications, such as propulsion, appliances, and heating and ventilation systems.

SUMMARY

The following summary is intended to introduce the reader to various aspects of the detailed description, but not to define or delimit any invention.

A system, method and computer program product for controlling a switched reluctance machine are provided. In some examples, the switched reluctance machine can be controlled to reduce the acoustic noise generated by the switched reluctance machine. The current waveform used to drive the switched reluctance machine can be controlled to reduce the acoustic noise. This can enable more widespread use of switched reluctance machines in a wide variety of applications.

Switched reluctance machines operate using electrical coils that are selectively energized to induce magnetic flux and compel the rotor of the switched reluctance machine to rotate. Operation of the switched reluctance machine can be controlled by controlling how current is provided to the electrical coils. Potential current waveforms for a given phase coil of the switched reluctance machine can be evaluated in order to select a waveform that reduces the acoustic noise level of the switched reluctance machine. A cumulative sound pressure level of the switched reluctance machine can be determined for each potential current waveform. The cumulative sound pressure level can be determined based on a plurality of harmonic sound pressure levels expected to result from the potential current waveform. A desired current waveform can be identified as the potential current waveform associated with an optimal cumulative sound pressure level. The desired current waveform can then be applied to the corresponding phase coil of the switched reluctance machine in order to operate the switched reluctance machine while reducing acoustic noise.

According to some aspects, a method of controlling a switched reluctance machine is provided. The method can include determining a plurality of potential phase current waveforms for a corresponding phase coil of the switched reluctance machine; for each potential phase current waveform, determining a cumulative sound pressure level of the switched reluctance machine, the cumulative sound pressure level determined based on a plurality of harmonic sound pressure levels expected to result from the potential phase current waveform; identifying a desired phase current waveform as the potential phase current waveform associated with an optimal cumulative sound pressure level; and applying the desired phase current waveform to the corresponding phase coil of the switched reluctance machine.

The desired phase current waveform can be determined using an iterative optimization process and each iteration of the iterative optimization process can include: identifying an iteration-specific potential phase current waveform; determining a plurality of iteration-specific circumferential orders associated with the iteration-specific potential phase current waveform; determining a plurality of radial force harmonic magnitudes associated with the iteration-specific potential phase current waveform; determining a plurality of iteration-specific forcing frequencies associated with the iteration-specific potential phase current waveform; and determining the cumulative sound pressure level for the iteration-specific potential phase current waveform using the plurality of iteration-specific circumferential orders, the plurality of iteration-specific forcing frequencies and the plurality of radial force harmonic magnitudes.

The cumulative sound pressure level can be determined by: identifying a plurality of iteration-specific harmonic sound pressure levels, each iteration-specific harmonic sound pressure level determined based on a combination of one of the iteration-specific circumferential orders, one of the iteration-specific forcing frequencies and one of the radial force harmonic magnitudes; determining the cumulative sound pressure level as a sum of the plurality of iteration-specific harmonic sound pressure levels.

Each iteration-specific harmonic sound pressure level can be determined using a look-up table defined based on simulated sound pressure levels associated with particular circumferential orders and particular forcing frequencies.

The look-up table can be defined during a preprocessing phase, and the pre-processing phase can include determining a plurality of dominant circumferential modes for the switched reluctance machine based on the geometry and pole configuration of the switched reluctance machine; for each dominant circumferential mode, determining a natural frequency associated with that dominant circumferential mode; determining the simulated sound pressure levels associated with that dominant circumferential mode by simulating a resultant sound pressure level corresponding to at least one frequency value proximate to the natural frequency using a vibroacoustic model of the switched reluctance machine; and storing the simulated sound pressure levels in the look-up table in association with the corresponding dominant circumferential mode and frequency value.

The plurality of dominant circumferential modes can be determined by: identifying a number of magnetic poles of the switched reluctance machine as a ratio between a number of stator poles of the switched reluctance machine and a number of phases of the switched reluctance machine; and identifying the dominant circumferential modes as a function of the number of magnetic poles.

The method can include, for each dominant circumferential mode: identifying higher-circumferential-order radial force harmonics that excite that dominant circumferential mode due to a sampling effect of the radial force density harmonics; and determining the simulated sound pressure levels associated with that dominant circumferential mode to include sound pressure resulting from the identified higher-circumferential-order radial force harmonics.

Determining the plurality of iteration-specific forcing frequencies can include: determining a motor speed of the switched reluctance machine; determining a plurality of iteration-specific temporal orders associated with the iteration-specific potential phase current waveform; and determining the plurality of iteration-specific forcing frequencies based on the motor speed and the plurality of iteration-specific temporal orders.

Determining the plurality of iteration-specific temporal orders can include: determining a radial force waveform associated with the iteration-specific potential phase current waveform; and calculating the plurality of iteration-specific temporal orders by applying a fast Fourier transform to the radial force waveform.

The method can include determining a plurality of dominant temporal orders; determining a subset of dominant iteration-specific temporal orders corresponding to the plurality of dominant temporal orders; and determining the plurality of iteration-specific forcing frequencies based on the motor speed and the subset of dominant iteration-specific temporal orders.

The plurality of dominant temporal orders can be determined based on the geometry and pole configuration of the switched reluctance machine.

Determining the plurality of dominant temporal orders can include: identifying a number of strokes in one mechanical revolution as a product of a number of rotor poles of the switched reluctance machine and a number of phases of the switched reluctance machine; and identifying the dominant temporal orders as a function of the number of strokes.

Determining the plurality of iteration-specific circumferential orders can include: determining a radial force waveform associated with the iteration-specific potential phase current waveform; and calculating the plurality of iteration-specific circumferential orders by applying a fast Fourier transform to the radial force waveform.

Determining the plurality of radial force harmonic magnitudes can include: determining a radial force waveform associated with the iteration-specific potential phase current waveform; and calculating the plurality of radial force harmonic magnitudes by applying a fast Fourier transform to the radial force waveform.

The plurality of iteration-specific circumferential orders and the plurality of radial force harmonic magnitudes can be determined concurrently by applying the fast Fourier transform to the radial force waveform.

The radial force waveform can be determined using a dynamic motor drive model based on a motor speed and a DC link voltage of the switched reluctance machine.

The radial force waveform can be determined based on a motor speed, phase voltages and phase currents of the switched reluctance machine.

According to some aspects, a system can include a switched reluctance machine comprising: a shaft; a rotor mounted to the shaft, the rotor having a plurality of salient rotor poles; a stator having a plurality of salient stator poles protruding from the stator towards the rotor poles; and a plurality of electrical coils wound about the stator poles, the plurality of electrical coils including a plurality of separate phase coils defining a plurality of phases of the switched reluctance machine; a power source; a power converter coupled to the power source and to the switched reluctance machine; and a controller; wherein the controller is configured to: determine a plurality of potential phase current waveforms for a corresponding phase coil of the switched reluctance machine; for each potential phase current waveform, determine a cumulative sound pressure level of the switched reluctance machine, the cumulative sound pressure level determined based on a plurality of harmonic sound pressure levels expected to result from the potential phase current waveform; identify a desired phase current waveform as the potential phase current waveform associated with an optimal cumulative sound pressure level; and apply the desired phase current waveform to the corresponding phase coil of the switched reluctance machine using the power converter.

The controller can be configured to determine the desired phase current waveform using an iterative optimization process and each iteration of the iterative optimization process can include: identifying an iteration-specific potential phase current waveform; determining a plurality of iteration-specific circumferential orders associated with the iteration-specific potential phase current waveform; determining a plurality of radial force harmonic magnitudes associated with the iteration-specific potential phase current waveform; determining a plurality of iteration-specific forcing frequencies associated with the iteration-specific potential phase current waveform; and determining the cumulative sound pressure level for the iteration-specific potential phase current waveform using the plurality of iteration-specific circumferential orders, the plurality of iteration-specific forcing frequencies and the plurality of radial force harmonic magnitudes.

The controller can be configured to determine the cumulative sound pressure level by: identifying a plurality of iteration-specific harmonic sound pressure levels, each iteration-specific harmonic sound pressure level determined based on a combination of one of the iteration-specific circumferential orders, one of the iteration-specific forcing frequencies and one of the radial force harmonic magnitudes; determining the cumulative sound pressure level as a sum of the plurality of iteration-specific harmonic sound pressure levels.

The system can include a non-transitory storage memory having stored therein a look-up table defined based on simulated sound pressure levels associated with particular circumferential orders and particular forcing frequencies, and the controller can be configured to determine each iteration-specific harmonic sound pressure level using the look-up table.

The look-up table can be defined during a preprocessing phase, and the pre-processing phase can include determining a plurality of dominant circumferential modes for the switched reluctance machine based on the geometry and pole configuration of the switched reluctance machine; for each dominant circumferential mode, determining a natural frequency associated with that dominant circumferential mode; determining the simulated sound pressure levels associated with that dominant circumferential mode by simulating a resultant sound pressure level corresponding to at least one frequency value proximate to the natural frequency using a vibroacoustic model of the switched reluctance machine; and storing the simulated sound pressure levels in the look-up table in association with the corresponding dominant circumferential mode and frequency value.

The plurality of dominant circumferential modes can be determined by: identifying a number of magnetic poles of the switched reluctance machine as a ratio between a number of stator poles of the switched reluctance machine and a number of phases of the switched reluctance machine; and identifying the dominant circumferential modes as a function of the number of magnetic poles.

For each dominant circumferential mode: higher-circumferential-order radial force harmonics that excite that dominant circumferential mode due to a sampling effect of the radial force density harmonics can be identified; and the simulated sound pressure levels associated with that dominant circumferential mode can be determined to include sound pressure resulting from the identified higher-circumferential-order radial force harmonics.

The controller can be configured to determine the plurality of iteration-specific forcing frequencies by: determining a motor speed of the switched reluctance machine; determining a plurality of iteration-specific temporal orders associated with the iteration-specific potential phase current waveform; and determining the plurality of iteration-specific forcing frequencies based on the motor speed and the plurality of iteration-specific temporal orders.

The controller can be configured to determine the plurality of iteration-specific temporal orders by: determining a radial force waveform associated with the iteration-specific potential phase current waveform; and calculating the plurality of iteration-specific temporal orders by applying a fast Fourier transform to the radial force waveform.

The controller can be configured to: determine a plurality of dominant temporal orders; determine a subset of dominant iteration-specific temporal orders corresponding to the plurality of dominant temporal orders; and determine the plurality of iteration-specific forcing frequencies based on the motor speed and the subset of dominant iteration-specific temporal orders.

The plurality of dominant temporal orders can be predetermined based on the geometry and pole configuration of the switched reluctance machine.

The plurality of dominant temporal orders can be predetermined by: identifying a number of strokes in one mechanical revolution as a product of a number of rotor poles of the switched reluctance machine and a number of phases of the switched reluctance machine; and identifying the dominant temporal orders as a function of the number of strokes.

The controller can be configured to determine the plurality of iteration-specific circumferential orders by: determining a radial force waveform associated with the iteration-specific potential phase current waveform; and calculating the plurality of iteration-specific circumferential orders by applying a fast Fourier transform to the radial force waveform.

The controller can be configured to determine the plurality of radial force harmonic magnitudes by: determining a radial force waveform associated with the iteration-specific potential phase current waveform; and calculating the plurality of radial force harmonic magnitudes by applying a fast Fourier transform to the radial force waveform.

The controller can be configured to determine the plurality of iteration-specific circumferential orders and the plurality of radial force harmonic magnitudes concurrently by applying the fast Fourier transform to the radial force waveform.

The controller can be configured to determine the radial force waveform using a dynamic motor drive model based on a motor speed and a DC link voltage of the switched reluctance machine.

The controller can be configured to determine the radial force waveform based on a motor speed, phase voltages and phase currents of the switched reluctance machine.

According to some aspects, there is provided a non-transitory computer readable medium storing computer-executable instructions, which, when executed by a computer processor, cause the computer processor to carry out a method of controlling a switched reluctance machine. The method includes determining a plurality of potential phase current waveforms for a corresponding phase coil of the switched reluctance machine; for each potential phase current waveform, determining a cumulative sound pressure level of the switched reluctance machine, the cumulative sound pressure level determined based on a plurality of harmonic sound pressure levels expected to result from the potential phase current waveform; identifying a desired phase current waveform as the potential phase current waveform associated with an optimal cumulative sound pressure level; and applying the desired phase current waveform to the corresponding phase coil of the switched reluctance machine.

The non-transitory computer readable medium can store computer-executable instructions, which, when executed by a computer processor, cause the computer processor to carry out the method of controlling a switched reluctance machine, where the method is described herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

DRAWINGS

For a better understanding of the various embodiments described herein, and to show more clearly how these various embodiments may be carried into effect, reference will be made, by way of example, to the accompanying drawings which show at least one example embodiment and which will now be briefly described.

Figure 16:
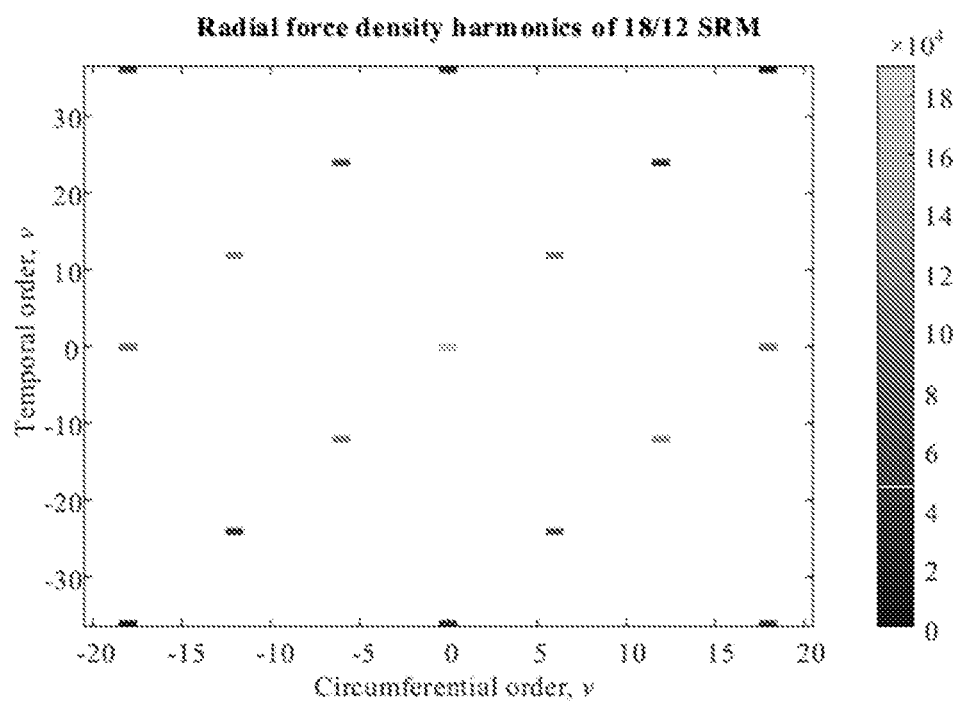
FIG. 16 shows an example plot of a fast Fourier Transform decomposition of the radial force density waveform shown in FIG. 15 for an example switched reluctance machine with 18 stator poles and 12 rotor poles.
Figure 17:
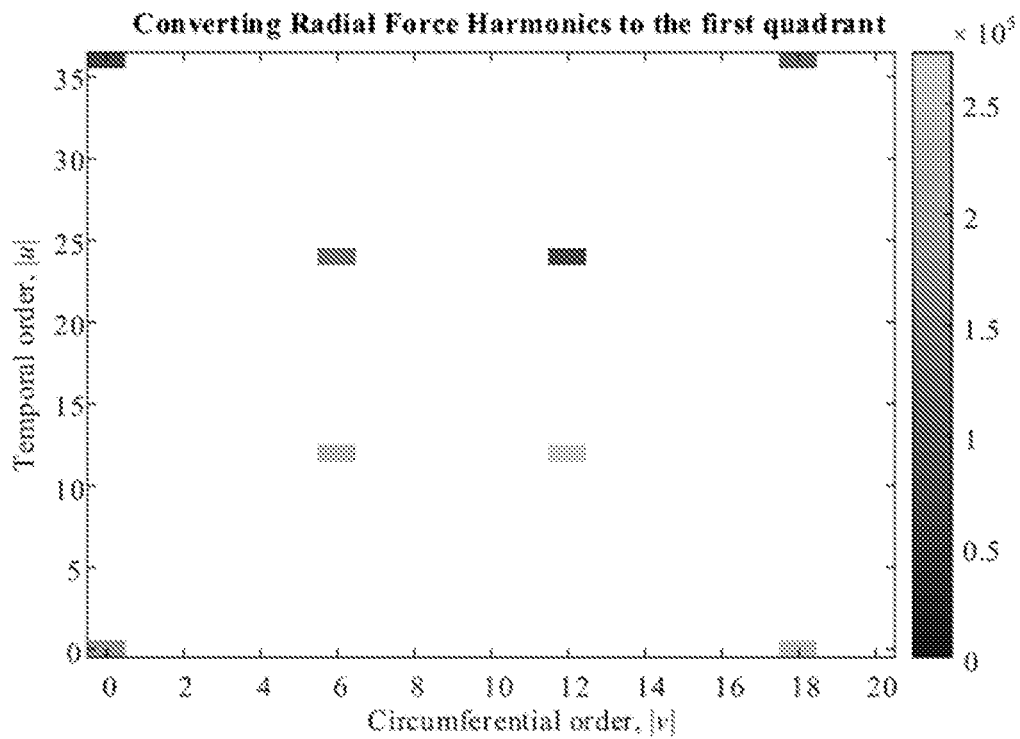
Figure 18:
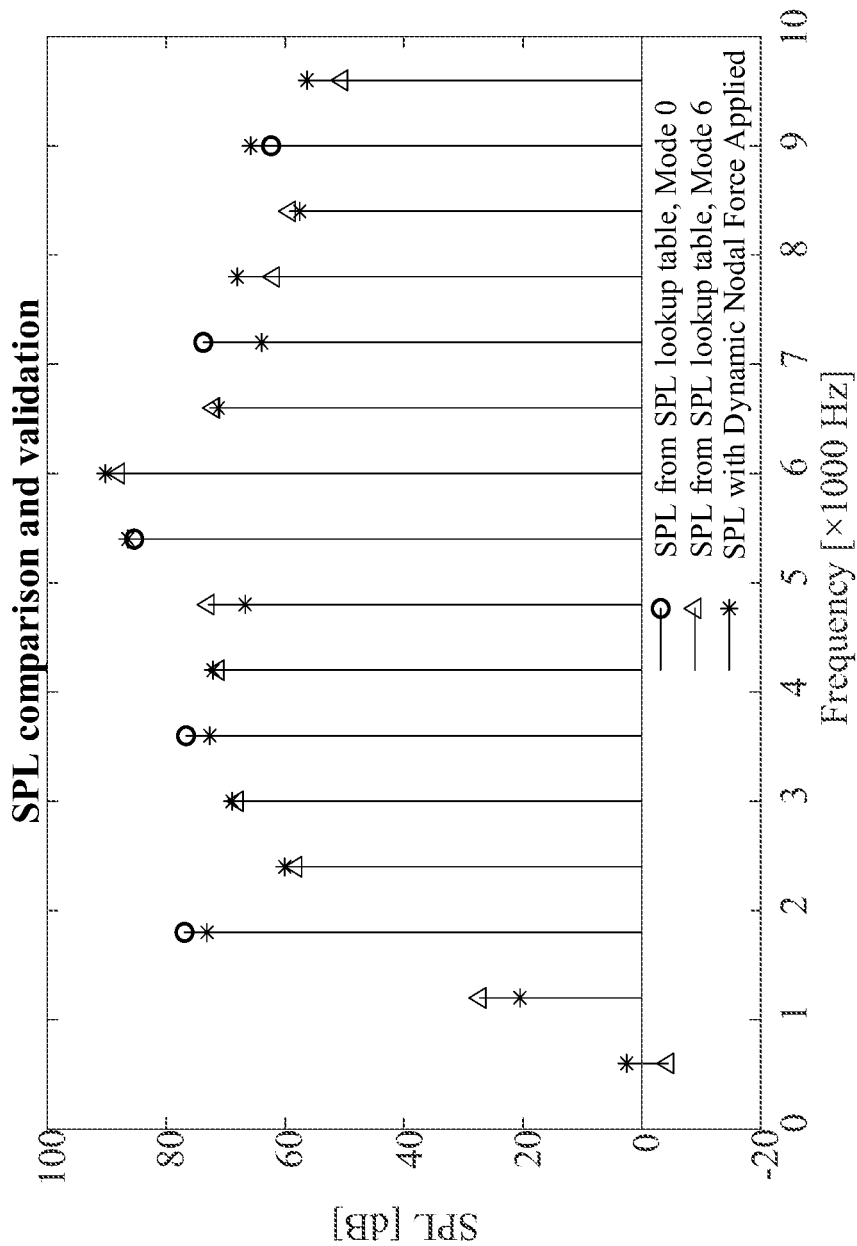

FIG. 17 shows an example plot of the radial force density harmonics from FIG. 16 in the first quadrant of a u-v plane for an example switched reluctance machine with 18 stator poles and 12 rotor poles; and FIG. 18 shows an example plot of simulated sound pressure levels determined in accordance with the methods described herein as compared to sound pressure levels determined based on dynamic current values and a finite element analysis simulation of a switched reluctance machine.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. Further, where considered appropriate, reference numerals may be repeated among the figures to indicate corresponding or analogous elements.

DETAILED DESCRIPTION

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

In embodiments comprising an "additional" or "second" component, the second component as used herein is physically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

The systems, methods, and devices described herein may be implemented as a combination of hardware or software. In some cases, the systems, methods, and devices described herein may be implemented, at least in part, by using one or more computer programs, executing on one or more programmable devices including at least one processing element, and a data storage element (including volatile and non-volatile memory and/or storage elements). These devices may also have at least one input device (e.g. a pushbutton keyboard, mouse, a touchscreen, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object-oriented programming. Accordingly, the program code may be written in any suitable programming language such as Python or C, for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Switched reluctance machines have a simple, low-cost, and robust construction. SRMs can operate without permanent magnets which have significant supply chain issues. Expanding the usability of switched reluctance machines may contribute to lower cost, reliable, high-performance machines for various applications without the supply chain risks inherent in machines requiring permanent magnets.

Switched reluctance machines can suffer from issues relating to acoustic noise and vibration. Large radial forces resulting from the salient pole construction of switched reluctance machines can deform the stator core and the frame resulting in vibrations and acoustic noise. This can be particularly problematic for noise-sensitive applications, such as propulsion, appliances, and heating and ventilation systems.

The acoustic noise performance of a switched reluctance machine is related to both electrical and mechanical aspects of the SRM. This presents additional challenges in reducing acoustic noise during operation of the SRM, as compared to controlling other performance parameters of the SRM such as torque and torque ripple which are more easily modelled.

Acoustic noise in an SRM is primarily generated when the radial forces excite the main vibration modes of the motor structure. The radial forces in an SRM change at different rotor positions as the rotor rotates. The radial forces also change at different angular positions of the airgap. Vibrations and acoustic noise are generated when the temporal and spatial harmonics of the radial forces interact with the vibration mode shapes of the motor structure.

The radial force density, which is radial forces per unit surface area, is a function of radial and tangential magnetic flux densities. The magnetic flux density in a switched reluctance machine is related to various parameters such as the pole configuration, motor geometry and current control. The magnitudes and the forcing frequencies of the radial force density harmonics, the modal properties, radiation ratios of the motor, and the properties of the acoustic medium contribute to the level of vibrations and acoustic noise.

The present application provides systems and methods that can reduce the acoustic noise and/or vibrations of a switched reluctance machine by controlling the current provided to the switched reluctance machine. The current can be controlled to directly reduce the sound pressure level of the switched reluctance machine. In particular, the current waveform applied to the phase coils of the switched reluctance machine can be determined to reduce the vibrations and/or acoustic noise of the switched reluctance machine.

The geometry and pole configuration of a switched reluctance machine can be used to determine the sound pressure levels that would result from radial force harmonics of a given frequency and circumferential order when the switched reluctance machine is in operation. Predicted sound pressure levels for various combinations of frequencies and circumferential orders can be determined in a preprocessing phase by simulating the sound pressure levels. These predicted sound pressure levels can then be used to control the current waveform during real-time operation of the switched reluctance machine. For example, predicted sound pressure levels can be defined for a given SRM geometry and pole configuration as a function of the frequency and circumferential order. These predicted sound pressure levels can be stored (e.g. in a look-up table) for quick and easy access during operation of the SRM.

The predicted sound pressure levels can be determined for dominant temporal and circumferential modes of the radial force harmonics of the SRM. This allows the preferred current waveform to be determined based on the radial force harmonics that contribute most to the acoustic noise of the SRM.

The predicted sound pressure levels can also be determined to include acoustic noise that results from higher-order modes which can excite the dominant modes due to sampling effects. This can further reduce the acoustic noise generated by the SRM.

The current waveform can be defined for an entire electrical cycle of the SRM. For example, a dynamic model of acoustic noise generation in a switched reluctance motor drive can be defined. This model can be used to determine the current for an entire electrical cycle.

The current waveform can be determined in real-time using models of the vibrations and acoustic noise generated by the switched reluctance machine. The current waveform may be determined in the absence of any vibration sensors on the SRM. This can simplify the construction of the SRM and ensure that all of the most relevant temporal and circumferential modes are considered when determining the current waveform.

The current waveform can be determined to reduce the sound pressure level directly. This can include consideration of the radiation efficiency for different frequencies and circumferential modes, ensuring that the waveform is selected to reduce the acoustic noise that would otherwise be radiated from the SRM.

The sound pressure levels of the SRM can be predicted based on various characteristics of the SRM. For instance, the acoustic noise generation of the SRM can be modelled based on characteristics such as the pole configuration, motor geometry, operating speed, load requirement, dominant temporal and circumferential modes, sampling effect, and radiation ratio. The modelled acoustic noise generation can be used to determine predicted sound pressure levels for the SRM under various operating conditions. The predicted sound pressure levels can then be stored for later access and retrieval. For example, the predicted sound pressure levels can be stored in one or more look-up tables that are categorized or indexed based on specified operating conditions for the SRM.

The predicted sound pressure levels can be used when determining the current waveform to be applied to the electrical coils of the SRM during operation. For instance, the predicted sound pressure levels for different potential current waveforms can be compared. A preferred current waveform can then be selected based on the comparison of the predicted sound pressure levels. For example, the preferred current waveform can be selected as the potential current waveform that provides an optimal cumulative sound pressure level for the SRM. The optimal cumulative sound pressure level may be determined using various different optimization parameters (e.g. performance metrics). For example, the optimal cumulative sound pressure level can be determined as the minimum sound pressure level that is achievable along with other specified performance objectives and/or constraints such as average torque, torque ripple, and efficiency for example.

Figure 1A:
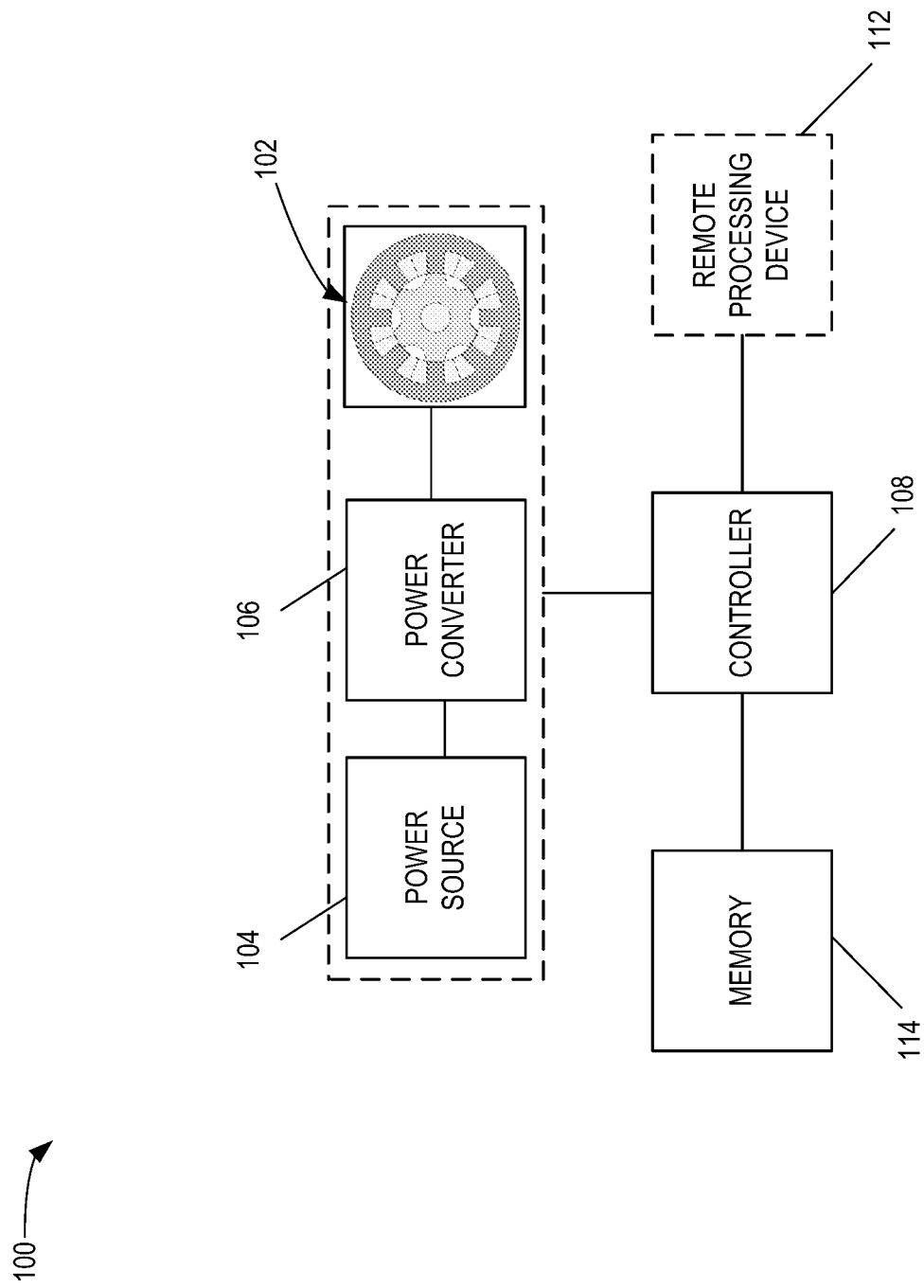
FIG. 1A shows a block diagram of an example system for controlling a switched reluctance machine.
Figure 1B:
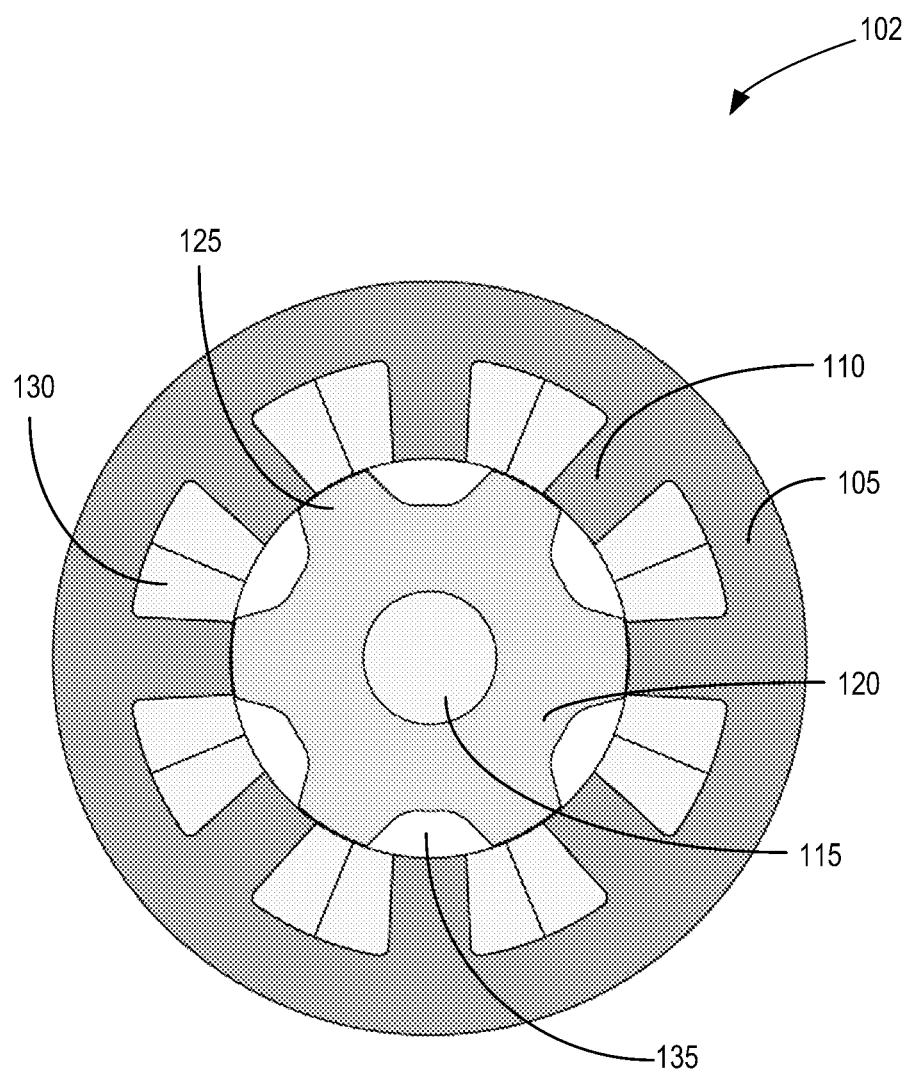
FIG. 1B shows a cross sectional view of an example switched reluctance machine that can be used with the system shown in FIG. 1.

Reference will now be made to FIGS. 1A and 1B concurrently. FIG. 1A shows a block diagram of an example system 100 for controlling a switched reluctance machine (SRM) 102. FIG. 1B illustrates an example of a switched reluctance machine 102 that may be used in system 100.

As shown in the example of FIG. 1A, the system 100 includes a switched reluctance machine 102, a power source 104, a power converter 106 and a controller 108. The system 100 can also include a memory 114 coupled to the controller 108. Optionally, system 100 may also include a remote processing device 112.

As shown in the example of FIG. 1A, a controller 108 may operate to drive the switched reluctance machine 102, e.g. by controlling the current provided to the phase coils of the switched reluctance machine 102 by the power source 104 and converter 106. The controller 108 may be any suitable processor, controller or digital signal processor that can provide sufficient processing power depending on the configuration, purposes and requirements of the reluctance machine as is known by those skilled in the art. Similarly, the processor may be coupled to volatile and non-volatile memory (e.g. memory 114) required for the processes performed by the reluctance machine 102.

As shown in FIG. 1B, SRM 102 is an example of a switched reluctance machine with eight (8) stator poles and six (6) rotor poles. The SRM 102 includes salient poles on the rotor and the stator. The salient pole configuration on both the rotor and the stator provides a relatively simple manufacturing process and robust operation for SRM. The example SRM 102 is shown with concentrated coil windings.

As shown, switched reluctance machine 102 includes a stator 105 and a rotor 120. The rotor 120 is mounted to a rotatable shaft 115. In the example illustrated, shaft 115 extends axially and the rotor 120 and stator 105 also extend axially. As should be apparent, the present disclosure can also be applied with other configurations of switched reluctance machines, including for example radial flux machines, axial flux machines, interior rotor machines, exterior rotor machines and so forth.

As illustrated, the stator 105 and rotor 120 can be disposed concentrically and coaxially with one another and with the shaft 115. In the SRM 102, the rotor 120 is positioned radially inward of the stator 105. Alternatively, a rotor can be positioned radially outward from the stator.

Both the stator 105 and rotor 120 include a plurality of protrusions that define salient teeth or salient poles. The stator 105 has a stator core that includes a plurality of stator teeth 110, in this case eight stator teeth 110. The rotor 120 includes a plurality of rotor teeth 125, in this case six rotor teeth 125. The stator teeth 110 protrude radially from the stator core towards the rotor 120. Similarly, the rotor teeth 125 protrude radially from the rotor 120 towards the stator 105.

An air gap 135 is also provided between the rotor poles 125 and the stator poles 110. The shaft 115 may be positioned within a central bore of the machine 102. As mentioned above, the SRM 102 is an example of an eight stator pole and six rotor pole switched reluctance machine with concentrated coil windings. That is, the stator 105 has coil windings 130 around each stator pole 110.

The coils 130 are wound around each stator pole 110 and connected together to create the phase windings for each phase. The coils 130 can include a plurality of separate phase coils defining a plurality of phases of the switched reluctance machine 102.

SRMs may be designed with varying numbers of stator and rotor poles, and varying number of phases. In general, SRMs typically do not include excitation sources on the rotor 120. As illustrated, the SRM 102 omits any excitation sources (e.g. permanent magnets) apart from the phase coils 130.

In an SRM, such as SRM 102, the windings 130 in different phases are energized as a function of the position of rotor 120. The rotor position, accordingly, also impacts the air gap 135 and phase inductance of the SRM 102.

In an SRM such as SRM 102, reluctance torque is the sole torque producing mechanism. When phase windings on the stator poles 110 of SRM 102 are excited with current, the excited pole draws the nearest rotor pole 125 into alignment with it to minimize the reluctance in the phase. In order to create motoring torque, the phases are excited on the rising slope of their inductance profiles.

As illustrated in SRM 102, a concentrated winding scheme is used and manipulated strategically to maintain motoring torque. In particular, the current is sequentially applied to different phases of SRM 102 to maintain motoring torque. The current applied to the different phases of SRM 102 can include various different profiles, including pulsated, rectangular current profiles for example.

The power converter 106 can control the current in each phase of the SRM 102. For example, the power converter 106 can include an asymmetric bridge converter operable to control the current in each phase. An asymmetric bridge converter can couple the power source 104 to a plurality of phase coils 130 using a plurality of switching sections. The power converter 106 can operate to selectively (and independently) energize the phase coils of each phase of the SRM 102. Optionally, the individual phase coils can be energized and de-energized so that only one phase is active (i.e. receiving current) at a given time. Alternatively, multiple phases can be activated concurrently.

In the SRM 102, the phase windings 130 for different phases can be electrically isolated from each other. An asymmetric bridge converter can be used to electrically isolate the phase coils 130 of SRM 102.

As noted above, the controller 108 can drive the switched reluctance machine 102 by controlling the current provided to the phase coils of the switched reluctance machine 102 by the power source 104 and converter 106. The controller 108 can be configured to drive SRM 102 in order to minimize or reduce the acoustic noise generated by the SRM 102 in operation. Controller 108 can identify a desired phase current waveform for each phase coil of the SRM 102. The desired phase current waveform can be identified as a phase current waveform associated with an optimal cumulative sound pressure level. For example, controller 108 can be configured to implement a method of controlling a switched reluctance machine such as the example method 200 described herein below with reference to FIG. 2.

The controller 108 can be communicatively coupled to one or more remote processing devices 112, e.g. using a wired connection and/or a wireless communication module (e.g., Bluetooth, Bluetooth Low-Energy, WiFi, ANT+ IEEE 802.11, etc.). The controller 108 can also be communicatively coupled to the one or more remote processing devices 112 over, for example, a wide area network such as the Internet. The remote processing device 112 can be any type of processing device such as (but not limited to) a personal computer, a tablet, a cloud server, and a mobile device such as a smartphone.

The remote processing device 112 typically includes a processing unit, an output device (such as a display, speaker, and/or tactile feedback device), a user interface, an interface unit for communicating with other devices, Input/Output (I/O) hardware, a wireless unit (e.g. a radio that communicates using CDMA, GSM, GPRS or Bluetooth protocol according to standards such as IEEE 802.11a, 802.11b, 802.11g, or 802.11n), a power unit, and a memory unit. The memory unit can include RAM, ROM, one or more hard drives, one or more flash drives or some other suitable data storage elements such as disk drives, etc.

The processing unit controls the operation of the remote processing device 108 and can be any suitable processor, controller or digital signal processor that can provide sufficient processing power depending on the desired configuration, purposes and requirements of the system 100.

Aspects of the monitoring, storage and analysis of current waveforms, sound pressure levels, and predicted sound pressure levels may be performed by one or more of the controller 108 and/or remote processing device 112. For example, a non-transitory storage memory (e.g. memory 114) of one or more of the controller 108 and/or remote processing device 112 can store various sound pressure level related data and preprocessed data such as predicted sound pressure levels, dynamic drive models, and SRM geometry and pole configuration data for example.

For example, the pre-processing phase 420 can be performed by one or more of the controller 108 and/or remote processing device 112. The pre-processed data (e.g. predicted sound pressure levels) can then be stored in non-transitory storage memory (e.g. memory 114) for real-time use when the operational phase 415 is conducted in real-time to control a switched reluctance machine.

Optionally, the pre-processing phase 420 and operational phase 415 can be performed by one or more of the controller 108 and/or remote processing device 112 in an offline operation. This offline operation can be defined to identify desired phase current waveforms (e.g. as at 230 herein below) for various different load conditions for a switched reluctance machine. These desired phase current waveforms (which may also be referred to a predetermined desired phase current waveforms can then be stored in non-transitory storage memory (e.g. memory 114) for real-time use when the switched reluctance machine is in operation. These predetermined desired phase current waveforms can then be used to control the operation of the switched reluctance machine in real-time (e.g. by providing current references for the phases of the switched reluctance machine).

A remote processing device 112 may provide additional processing resources not available on the controller 108. Some aspects of determining the predicted sound pressure levels for a given switched reluctance machine may be performed by the remote processing device 112. For example, the remote processing device 112 may perform aspects of the pre-processing phase 420. The controller 108 and remote processing device 112 may communicate in real-time to determine a cumulative sound pressure level for a potential current waveform and/or determine a desired current waveform.

Alternatively or in addition, pre-processed data such as predicted sound pressure levels for a given switched reluctance machine may be stored using memory 114. This may allow the controller 108 to determine the cumulative sound pressure level for a potential current waveform and/or determine the desired current waveform locally and in real-time.

Figure 2:
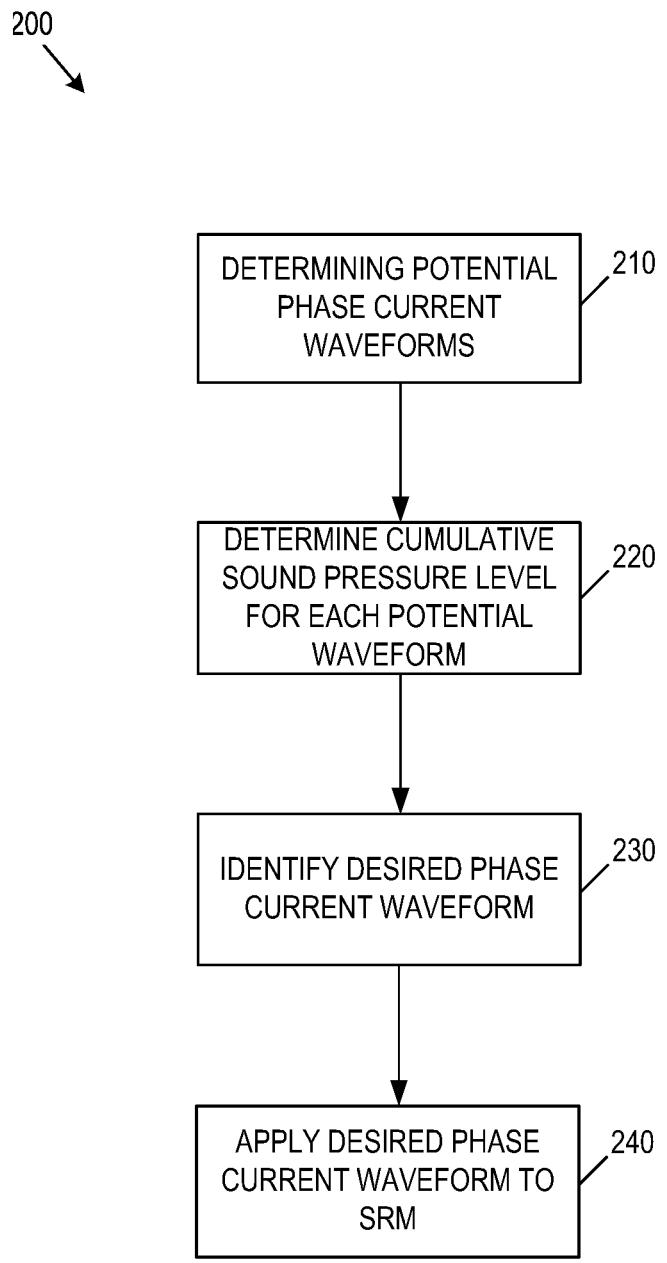
FIG. 2 shows a flowchart of an example method of controlling a switched reluctance machine.

Referring now to FIG. 2, shown therein is an example method 200 for controlling a switched reluctance machine. Method 200 is an example of a method for controlling a switched reluctance machine that can be used to operate a switched reluctance machine with reduced noise. Method 200 can be performed by various systems for controlling and driving switched reluctance machines, such as the example system 100 described herein above.

Figure 4:
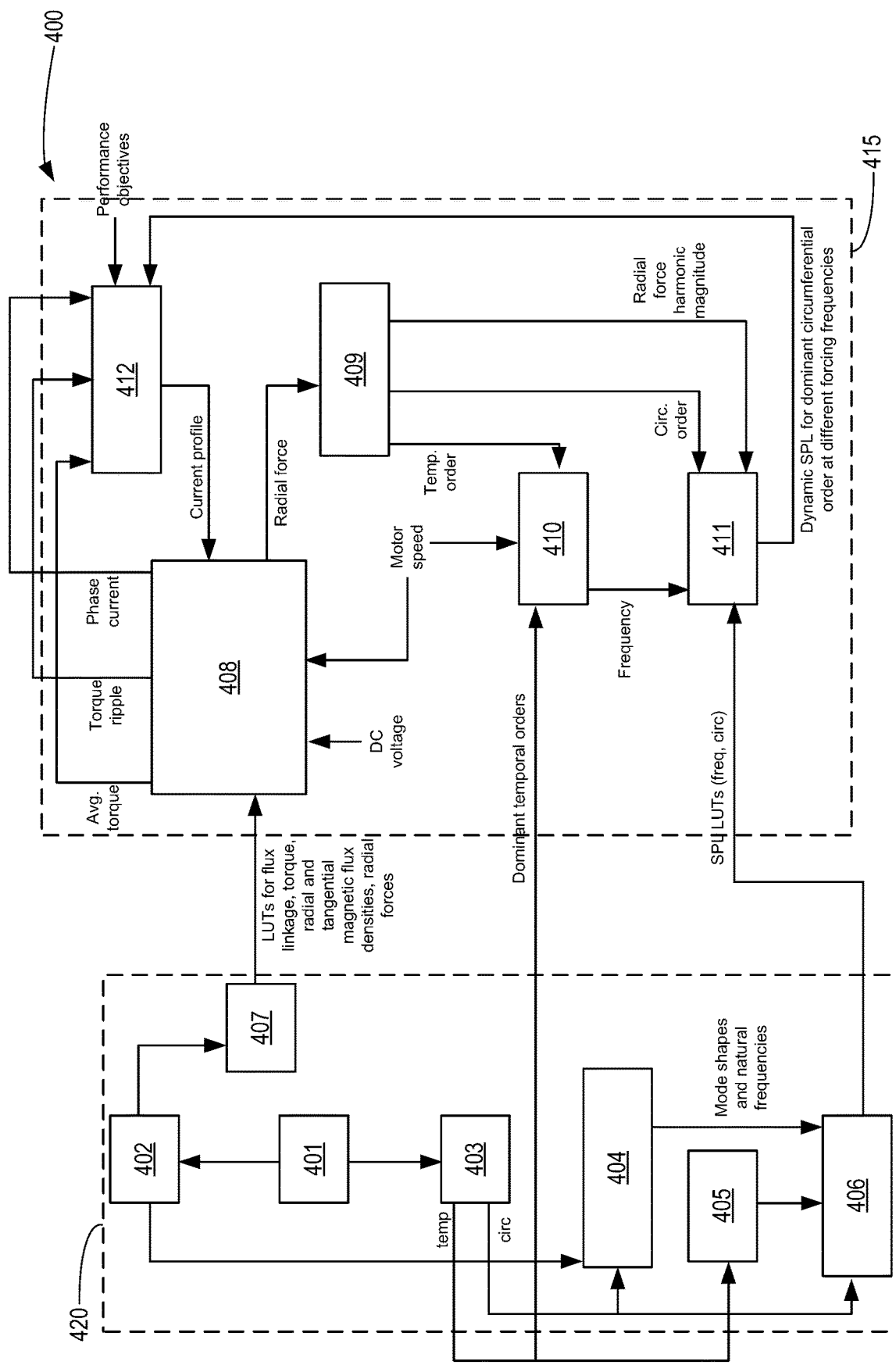
FIG. 4 shows an example flowchart of data flow between sub-processes that can be used with the methods shown in FIG. 2 and FIG. 3.

Throughout the description of method 200 (as well as method 300 below), reference will be made concurrently to FIG. 4. FIG. 4 illustrates an example of data flow between sub-processes that can be used to determine a cumulative sound pressure level and desired phase current waveform for a switched reluctance machine. Sub-processes 401-412 shown in FIG. 4 are examples of various sub-processes that can be used to determine cumulative sound pressure level and desired phase current waveform for a switched reluctance machine.

A pre-processing phase 420 can be used to determine features and characteristics of the switched reluctance machine that remain static during the operation of the switched reluctance machine. The data generated during the pre-processing phase can then be used during the operational phase 415 of the switched reluctance machine (e.g. in sub-processes 408-412) to determine desired current waveforms that can be applied to the phase coils of the switched reluctance machine in real-time.

At 401, the pole configuration of the switched reluctance machine can be defined. The pole configuration can be defined based on the number of stator poles and rotor poles of the switched reluctance machine for which the current waveform is being optimized. The pole configurations can include various arrangements of the stator and rotor, including interior or exterior rotor SRMs. The pole configuration of the switched reluctance machine can be used to determine the circumferential and temporal harmonics of the radial force waveform for the switched reluctance machine, which impact the noise characteristics of the SRM.

At 402, the geometry of the switched reluctance machine can be defined. The geometry of the switched reluctance machine can include all geometrical and material details of the motor, such as the stator geometry and electrical steel properties, rotor geometry and electrical steel properties, stator coils and material properties, stator housing and its material properties and boundary conditions (e.g. how the motor is mounted), and so forth.

The geometry of the switched reluctance machine can be used to determine various characteristics of the SRM, such as the magnetic flux density, torque, and voltage level of the motor, as well as the radial force level. The geometry of the switched reluctance machine can impact both the electrical and mechanical properties of the SRM when considering the acoustic noise generated by the SRM.

The geometry of the switched reluctance machine can be used for additional pre-processing and modelling of the switched reluctance machine. For instance, the geometry of the SRM can be used to determine static electromagnetic characteristics of the SRM through electromagnetic finite element analysis (FEA) as discussed in further detail below with reference to 407. The geometry of the SRM can also be used to determine the dominant modal properties of the SRM through vibroacoustic FEA as discussed in further detail below with reference to 404. Once the geometry of the switched reluctance machine is determined at 402, the static electromagnetic characteristics (at 407) and dominant modal properties (at 404) can be determined. The static electromagnetic characteristics (at 407) and dominant modal properties (at 404) may be determined concurrently through respective electromagnetic FEA and vibroacoustic FEA processes.

Referring again to FIG. 2, at 210 a plurality of potential phase current waveforms can be determined for a phase coil of a switched reluctance machine. Each potential phase current waveform can include a current profile that can be applied to the corresponding phase coil to drive rotation of the rotor of the switched reluctance machine.

Each potential phase current waveform can be defined for an entire electrical cycle of the switched reluctance machine. Each potential phase current waveform can include a uniquely shaped current profile. Each current profile can have a unique combination of profile characteristics such as shape, magnitude, excitation period(s) and so forth.

The potential phase current waveforms may be determined based on operational constraints associated with the switched reluctance machine and or the associated drive system. In some cases, the potential phase current waveforms can be identified using an iterative process in which a first potential phase current waveform is defined and then modified iteratively in order to generate the other potential phase current waveforms.

For example, the potential phase current waveforms (or at least the first potential phase current waveform) can be determined using one or more predetermined current waveforms for the switched reluctance machine.

Alternatively, the potential phase current waveforms may be determined (at least in part) using conventional control methods. For example, the first potential phase current waveform can be identified using conventional control methods. This first potential phase current waveform can then be modified iteratively in order to generate the plurality of potential phase current waveforms.

At 220, a cumulative sound pressure level can be determined for each potential phase current waveform from 210. An example process 300 for determining the cumulative sound pressure level for a given phase current waveform is described in further detail herein below with reference to FIG. 3.

The cumulative sound pressure level can be determined based on a plurality of harmonic sound pressure levels expected to result from the potential phase current waveform. That is, the cumulative sound pressure level can be determined based on a combination of the sound pressure levels from different harmonics that would be expected to result from applying the potential phase current waveform to the corresponding phase coil of the SRM.

Optionally, the cumulative sound pressure level may be determined based on a filtered plurality of harmonic sound pressure levels. For example, harmonic sound pressure levels corresponding to tones (e.g. frequencies) that are not perceptible to human ears may be filtered out when determining the cumulative sound pressure level. This can allow the potential phase current waveforms to be evaluated based on sound pressure levels that would be detectable by a human and are thus more likely to result in an undesirable experience for humans near the switched reluctance machine when in use.

At 230, a desired phase current waveform can be identified from the plurality of potential phase current waveforms from 210. The desired phase current waveform can be identified as the potential phase current waveform associated with an optimal cumulative sound pressure level. The optimal cumulative sound pressure level can be determined directly based on dynamic calculations of the cumulative sound pressure level that is predicted to result from each potential phase current waveform.

The phase current waveform for a switched reluctance machine is typically defined to achieve one or more operational objectives. Examples of operational objectives include average torque, torque ripple, and radial force waveform. The evaluation of how a phase current waveform will perform in respect of the one or more operational objectives often involves modelling the operations of the switched reluctance machine.

One or more objective functions can be used to identify operational parameters that can be used to determine a potential phase current waveform. The objective functions can be used to determine operational parameters such as the average torque, torque ripple, dynamic current, and sound pressure level associated with a potential phase current waveform. These operational parameters can then be evaluated based on the one or more operational objectives for the switched reluctance machine. Examples of sub-processes that can be used as objective functions are described in further detail below with respect to sub-processes 408-411 in FIG. 4.

Optionally, the objective functions can be calculated for the switched reluctance machine during an offline process to determine desired phase current waveforms. These predetermined desired phase current waveforms can then be referenced to control the operation of the switched reluctance machine in real-time.

Alternatively, the objective functions can be calculated for the switched reluctance machine in real-time using pre-processed data corresponding to the switched reluctance machine. Determining the sound pressure level for a given potential current waveform requires a determination of the radial forces generated by that potential current waveform. Similarly, other operational parameters such as the electromagnetic torque and torque ripple can be considered when evaluating a given potential current waveform. The radial forces, torque, and torque ripple are electromagnetic quantities that result from electromechanical energy conversion. Accordingly, the pre-processed data can include static electromagnetic characteristics of the switched reluctance machine determined during the pre-processing phase.

Static electromagnetic characteristics such as radial and tangential magnetic flux densities can be determined as functions of operational variables such as rotor position, spatial position in the airgap, and current magnitude. For example, the static electromagnetic characteristics may be modelled using a Maxwell Stress Tensor as described in further detail below with reference to sub-process 407. The static electromagnetic characteristics can then be stored for later access and use during the calculation of the objective functions.

The static electromagnetic characteristics can be stored in a non-transitory storage memory such as memory 114. The stored static electromagnetic characteristics can then be accessed during the operational processes 415 and used to determine a desired current waveform and associated cumulative sound pressure level. For example, the static electromagnetic characteristics can be stored as look-up tables that are indexed based on the corresponding operational variables. This allows the operational parameters for a potential current waveform to be determined dynamically, e.g. as described in further detail below with reference to sub-process 408.

The pre-processed data can include static vibroacoustic characteristics of the switched reluctance machine determined during the pre-processing phase. The static vibroacoustic characteristics such as sound pressure levels can be determined as functions of operational variables such as the forcing frequencies and circumferential orders. For example, the static vibroacoustic characteristic may be determined as described in further detail below with reference to sub-process 406 of FIG. 4. The static vibroacoustic characteristic can then be stored for later access and use during the calculation of the objective functions.

The static vibroacoustic characteristics can be stored in a non-transitory storage memory such as memory 114. The stored static vibroacoustic characteristics can then be accessed during the operational processes 415 and used to determine the desired current waveform and associated cumulative sound pressure level. For example, the static vibroacoustic characteristics can be stored as look-up tables that are indexed based on the corresponding operational variables. This allows the acoustic noise level for a potential current waveform to be determined dynamically, e.g. as described in further detail below with reference to sub-process 411.

Current profiling can be used to determine the desired phase current waveform using the outputs from the objective functions (e.g. the dynamic calculation of acoustic noise levels at 411 and the dynamic calculation of operational parameters at 408). An example current profiling sub-process is shown at 412 in FIG. 4. Current profiling methods can be applied to achieve the one or more operational objectives, such as maximizing average torque, minimizing torque ripple, minimizing phase current, and minimizing sound pressure level for example.

The desired phase current waveform can be determined using an iterative optimization process. In each iteration of the optimization, the phase current profile of one of the potential phase current waveforms from 210 can be evaluated. The evaluation of the iteration-specific potential phase current waveform for a given iteration can include determining the cumulative sound pressure level (at 220) for that iteration-specific potential phase current waveform (e.g. using sub-process 411).

Optionally, the evaluation of the iteration-specific potential phase current waveform for a given iteration can include determining other operational objectives for that iteration-specific potential phase current waveform. For example, the phase current profile of the iteration-specific potential phase current waveforms can be provided as an input to a dynamic motor drive model in sub-process 408. The dynamic motor drive model can be defined to calculate operational objectives for that iteration-specific potential phase current waveform using the stored electromagnetic characteristics for the switched reluctance machine as well as other operational parameters such as the motor speed and DC link voltage.

The desired phase current waveform can then be identified as one of the iteration-specific potential phase current waveforms evaluated through the iterative optimization process. The desired phase current waveform can then be identified as the iteration-specific potential phase current waveform corresponding to an optimal cumulative sound pressure level.

The optimal cumulative sound pressure level may be determined through an optimization process defined to minimize the acoustic noise level of the SRM. Optionally, the optimal cumulative sound pressure level can be determined as the minimum sound pressure level achievable. This can ensure that the switched reluctance machine operates with an absolute minimum level of acoustic noise generation.

Alternatively or in addition, the optimal cumulative sound pressure level may be determined through an optimization process that considers the acoustic noise level in combination with other operational objectives. The optimization process can be defined to determine the optimal cumulative sound pressure level as the minimum sound pressure level achievable by a potential current waveform that is also capable of achieving the other operational objectives.

Alternatively, the optimization process can be defined to minimize a multi-variable cost function that includes the cumulative sound pressure level as one of the variables. The cost function can be a weighted cost function that considers the acoustic noise level in combination with other operational objectives. The optimal cumulative sound pressure level can then be determined to be the sound pressure level that corresponds to the potential current waveform that results in the lowest overall cost for of the cost function.

Regardless of the operational objectives being optimized, the optimization process can be constrained by both practical and operational constraints. For instance, the optimization process can be constrained to ensure that operational parameters such as the average torque, torque ripple, dynamic current, and sound pressure level remain within defined operational ranges for a given application.

At 240, the desired phase current waveform from 230 can be applied to the corresponding phase coil of the switched reluctance machine. Applying the current waveform to the phase coil of the switched reluctance machine can be used to drive the operation of the switched reluctance machine.

The example method 200 described herein above relates to the process for determining a desired phase current waveform for one phase coil of a switched reluctance machine. However, method 200 can be implemented to determine respective desired phase current waveforms for each phase coil of the switched reluctance machine concurrently.

That is, a desired plurality of phase current waveforms can be determined concurrently. The desired plurality of phase current waveforms can include a corresponding desired current waveform for each of the phases of the switched reluctance machine. The desired plurality of phase current waveforms can be determined by optimizing the current waveforms concurrently for all phases. This can involve analyzing the acoustic noise level (and other operational parameters) based on potential waveforms for each phase of the switched reluctance machine. In the case of a three-phase switched reluctance machine, the desired plurality of phase current waveforms can include a desired incoming phase current waveform for an incoming phase (where the phase current increases), a desired outgoing phase current waveform for an outgoing phase (where the phase current decreases), and a desired conducting phase current waveform for a conducting phase.

Method 200 can also be performed on an ongoing basis by a controller of a switched reluctance machine. That is, the controller can repeatedly determine the desired phase current waveform and/or desired plurality of phase current waveforms for the switched reluctance machine on an ongoing/continual basis. This can ensure that the switched reluctance machine continues to operate with reduced/minimal acoustic noise.

Optionally, steps 210-230 of method 200 can be performed in real-time to determine the desired phase current waveforms for the switched reluctance machine. This can involve measuring the operating parameters of the switched reluctance machine and using these values for various sub-processes (e.g. using the measured phase currents as inputs to sub-process 412 rather than phase current generated by a drive model).

Alternatively, steps 210-230 of method 200 can be performed offline to predetermine the desired phase current waveforms for the switched reluctance machine. This can involve determining the desired phase current waveforms for various load conditions and operating parameters of the switched reluctance machine. The predetermined desired phase current waveforms can then be stored in a non-transitory storage memory and accessed during operation of the switched reluctance machine to determine the desired phase current waveform to be applied at 240.

Figure 3:
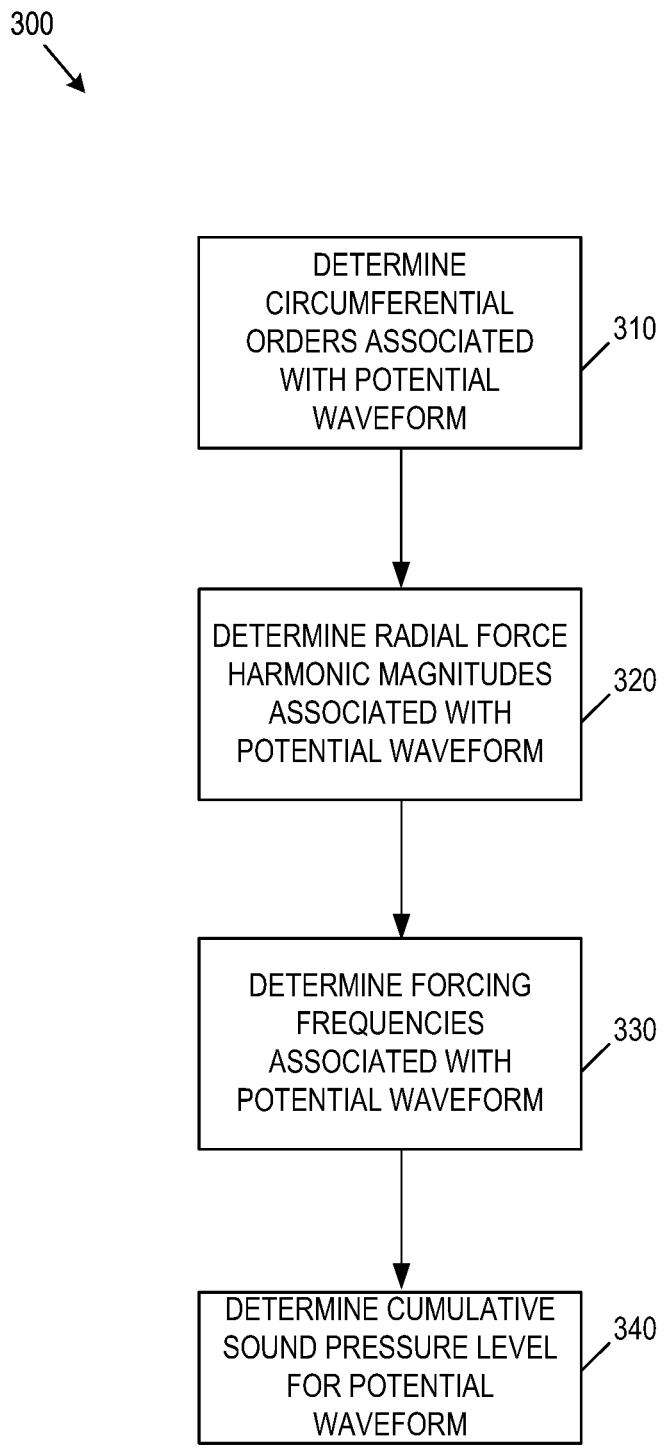
FIG. 3 shows a flowchart of an example method of determining a cumulative sound pressure level that can be used with the method shown in FIG. 2.

Referring now to FIG. 3, shown therein is an example method 300 for determining a cumulative sound pressure level associated with the operation of a switched reluctance machine. Method 300 is an example process that can be used to determine the cumulative sound pressure level that is expected to result from applying a particular phase current waveform to a corresponding phase coil of a switched reluctance machine.

Method 300 can be used to evaluate a plurality of potential phase current waveforms, for instance at step 220 of method 200. As noted above, a desired phase current waveform can be determined through an iterative optimization process that is used to evaluate the plurality of potential phase current waveforms. Method 300 may be repeated for each of the potential phase current waveforms in the plurality of potential phase current waveforms. For each iteration of method 300, a corresponding iteration-specific potential phase current waveform can be identified.

At 310, a plurality of iteration-specific circumferential orders associated with the iteration-specific potential phase current waveform can be identified.

The plurality of iteration-specific circumferential orders can be determined based on a radial force waveform associated with the iteration-specific potential phase current waveform. For example, the plurality of iteration-specific circumferential orders can be calculated by applying a fast Fourier transform to the radial force waveform in sub-process 409.

At 320, a plurality of radial force harmonic magnitudes associated with the iteration-specific potential phase current waveform can be determined.

The plurality of radial force harmonic magnitudes can also be determined based on a radial force waveform associated with the iteration-specific potential phase current waveform. For example, the plurality of radial force harmonic magnitudes can be calculated by applying the fast Fourier transform to the radial force waveform in sub-process 409.

Although 310 and 320 are shown as separate steps, the plurality of iteration-specific circumferential orders and the plurality of radial force harmonic magnitudes can be determined concurrently. For example, the plurality of iteration-specific circumferential orders and the plurality of radial force harmonic magnitudes can be determined concurrently by applying a two-dimensional fast Fourier transform to the radial force waveform in sub-process 409. Applying the two-dimensional fast Fourier transform to the radial force waveform can identify the circumferential orders as well as temporal orders (as explained further below at 330) associated with the dynamic radial force waveform along with the radial force harmonic magnitudes for each temporal order and circumferential order.

Optionally, the plurality of iteration-specific circumferential orders determined at 310 may include only dominant circumferential orders for the switched reluctance machine. That is, the plurality of iteration-specific circumferential orders determined at 310 can be limited to those circumferential orders determined by applying the two-dimensional Fourier transform to the radial force waveform that are also identified as dominant circumferential orders for the switched reluctance machine.

Dominant circumferential orders generally refer to those circumferential orders that contribute substantially to the acoustic noise and vibration (e.g. more than other circumferential orders of the SRM). The radial forces in a switched reluctance motor can have many harmonics. However, due to the pole configuration, number of phases, and number of poles, certain circumferential orders contribute to the acoustic noise and vibration more than others. From a computational perspective, it is often not efficient to evaluate all possible circumferential orders for the switched reluctance machine. Accordingly, the dominant circumferential orders can be determined during a pre-processing phase. This can allow for a more efficient evaluation of the predicted acoustic noise levels associated with a potential current waveform with minimal impact on the accuracy of the prediction.

The dominant circumferential orders can be determined in sub-process 403 of the pre-processing phase 420. A plurality of dominant circumferential vibration modes can be determined for the switched reluctance machine based on the pole configuration (e.g. from 401) of the switched reluctance machine.

The number of magnetic poles of the switched reluctance machine can be determined. For instance, the magnetic poles can be determined as a ratio between the number of stator poles Ns of the switched reluctance machine and the number of phases m of the switched reluctance machine. The dominant circumferential vibration modes can be identified as a function of the number of magnetic poles.

The difference between the dominant circumferential orders of the vibration modes in the SRM can be determined by the number of magnetic poles. For example, the dominant circumferential orders v of the vibration modes of the SRM can be determined using a function of number of magnetic poles and an arbitrary integer i according to:

$$v = \frac{N_s}{m} i$$

The dominant circumferential orders v can include each circumferential order vibration mode determined according to:

$$v = \frac{N_s}{m} i$$

for a plurality of arbitrary integers i. The dominant circumferential orders v can include all of the circumferential order vibration modes up to $N_s/2$ for the stator of an interior rotor (IR) SRM, or $N_r/2$ for the rotor of an exterior rotor (ER) SRM. After this point (i.e. after $N_s/2$ or $N_r/2$), the sampling effect begins to apply. Accordingly, the plurality of arbitrary integers i can include the set of integers usable to determine the dominant circumferential orders up to that point.

The dominant circumferential modes can then be stored for later use during the pre-processing phase 420 and the operational phase 415 for the switched reluctance machine. For instance, the dominant circumferential modes for the switched reluctance machine can be stored in non-transitory storage memory such as memory 114. Harmonic sound pressure levels may then be determined (e.g. in sub-process 411) only for those harmonics that correspond to the dominant circumferential modes determined for the switched reluctance machine.

Optionally, higher-circumferential-orders that can impact the plurality of dominant circumferential modes due to the sampling effect can also be identified. Higher-order vibration modes normally have high natural frequencies. As a result, it would typically be harder for higher-circumferential-order radial force harmonics to excite their corresponding vibrational modes of the SRM. However, the higher-circumferential-order radial force harmonics can excite lower-circumferential-order vibration modes due to a sampling effect. Including the impact of the sampling effect on the dominant circumferential modes can ensure that the sound pressure level determined for a potential current waveform accounts for higher-circumferential-order modes that can contribute significantly to the acoustic noise generated by the SRM.

For each dominant circumferential mode, higher-circumferential-order radial force harmonics that excite lower-order vibration modes due to a sampling effect of the radial force density harmonics can be identified. For example, these higher-circumferential-order modes that impact the dominant circumferential modes due to the sampling effect can be determined in sub-process 405.

A higher-circumferential-order radial force harmonic that can contribute to the sound pressure level generated by exciting a lower-order circumferential vibration mode can be identified as a circumferential order v identified according to:

$v > N_s/2$ for the stator of an interior rotor(IR)SRM $v > N_r/2$ for the rotor of an exterior rotor(ER)SRM where $N_s$ is the number of stator poles (e.g. as determined from 401), and $N_r$ is the number of rotor poles (e.g. as determined from 401).

The sampling effect for a switched reluctance machine with a pole configuration with $N_s$ number of stator poles, $N_r$ number of rotor poles, and m number of phases can be calculated as:

If $mod(v,N_s)=0$, this radial force harmonic excites mode0

If $mod(v,N_s)\neq 0$ and $mod(v,N_s/m)=0$, this radial force harmonics excites mode $N/m$.

Accordingly, a higher-circumferential-order mode that impacts a dominant circumferential mode can be identified as a higher-circumferential-order mode for which the corresponding radial force harmonic excites a dominant circumferential mode.

A plurality of higher-circumferential-order mode that impact a dominant circumferential mode can be identified for the switched reluctance machine. The effect of the high circumferential order of the radial force density harmonic on the vibration and acoustic noise decreases as the circumferential order increases, due to the sampling effect. Accordingly, the set of circumferential orders included in the plurality of higher-circumferential-order modes that impact a dominant circumferential mode may be selected based on a tradeoff between accuracy and computational cost. This can depend on the particular implementation of the SRM drive.

Optionally, the plurality of higher-circumferential-order modes can be limited to circumferential modes up to is $2N_s$ for the stator of an interior-rotor SRM, or $2N_r$ for the rotor of an exterior-rotor SRM. This cut-off can provide good accuracy at a relatively small computation cost.

FIGS. 8A-8D illustrate example plots of the sampling effect on high-circumferential-order harmonics for a switched reluctance machine with 12 stator poles. In FIGS. 8A-8D, the stator is shown cut in half and opened flat for ease of exposition.

Figure 8:
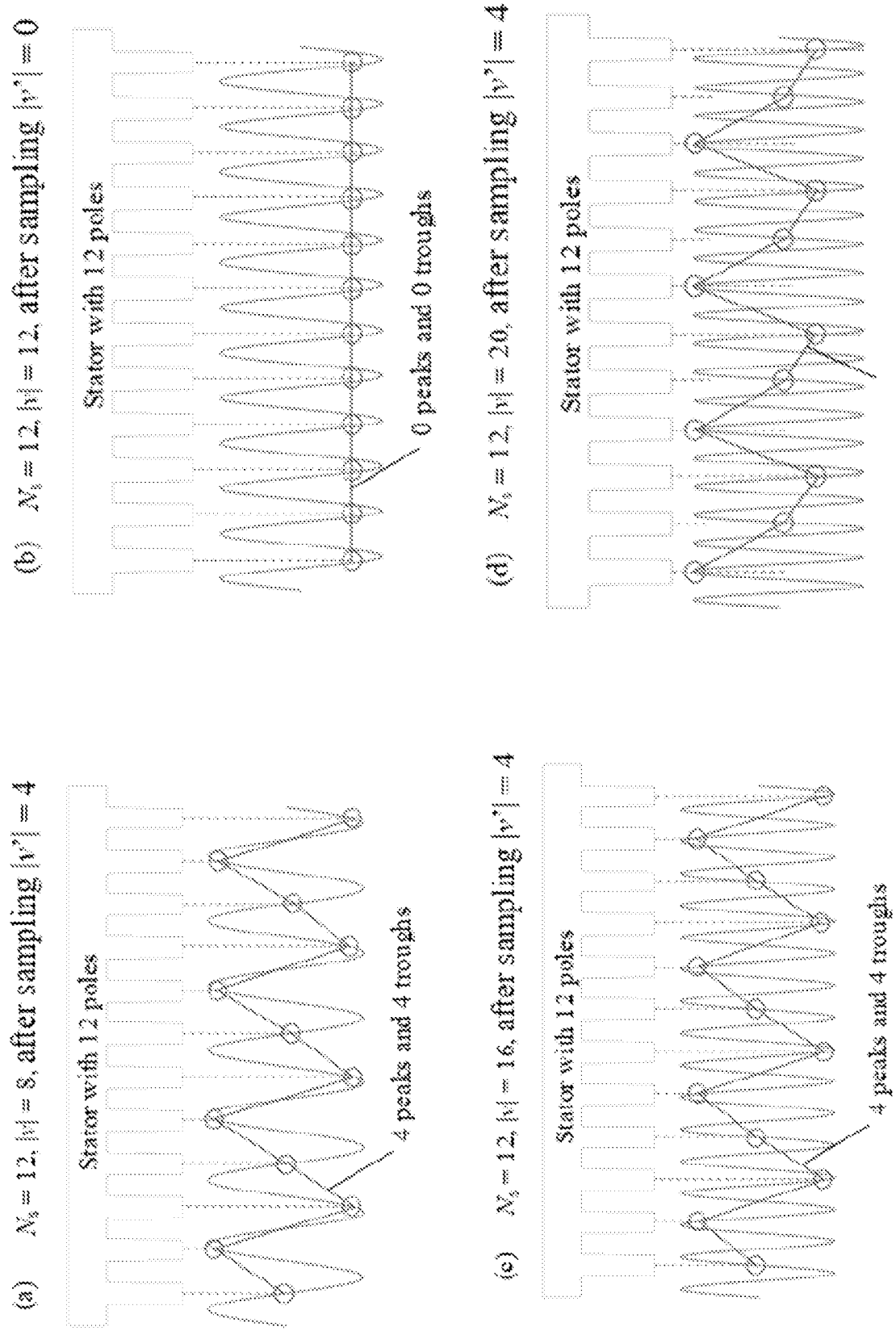
FIGS. 8A-8D show example plots of the excitation of lower-circumferential-order vibration modes caused by higher-circumferential-order radial force harmonics due to the sampling effect for an example switched reluctance machine with 18 stator poles.

FIG. 8A illustrates the sampling effect for the 8th order circumferential mode. Prior to sampling, this circumferential mode has eight peaks and eight troughs. This harmonic generates forces on the stator poles as shown in FIG. 8A. When the 8th order circumferential mode is sampled by the stator poles, it interacts with (i.e. the second, fifth, eighth and eleventh stator poles), it results in four peaks and four troughs, which can excite vibration mode four.

FIG. 8B illustrates the sampling effect for the 12th order circumferential mode. Prior to sampling, this circumferential mode has twelve peaks and twelve troughs. For this circumferential mode, the stator poles sample the same point on the waveform. Due to sampling effect, this harmonic can excite vibration mode zero.

FIG. 8C illustrates the sampling effect for the 16th order circumferential mode. Prior to sampling, this circumferential mode has sixteen peaks and sixteen troughs. This harmonic generates forces on the stator poles. When the 16th order circumferential mode is sampled by the stator poles it interacts with (i.e. the second, fifth, eighth and eleventh stator poles), it results in four peaks and four troughs, which can again excite vibration mode four.

FIG. 8D illustrates the sampling effect for the 20th order circumferential mode. Prior to sampling, this circumferential mode has twenty peaks and twenty troughs. This harmonic generates forces on the stator poles. When the 20th order circumferential mode is sampled by the stator poles it interacts with (i.e. the first, fourth, seventh and tenth stator poles), it again results in four peaks and four troughs, which can again excite vibration mode four.

Figure 9:
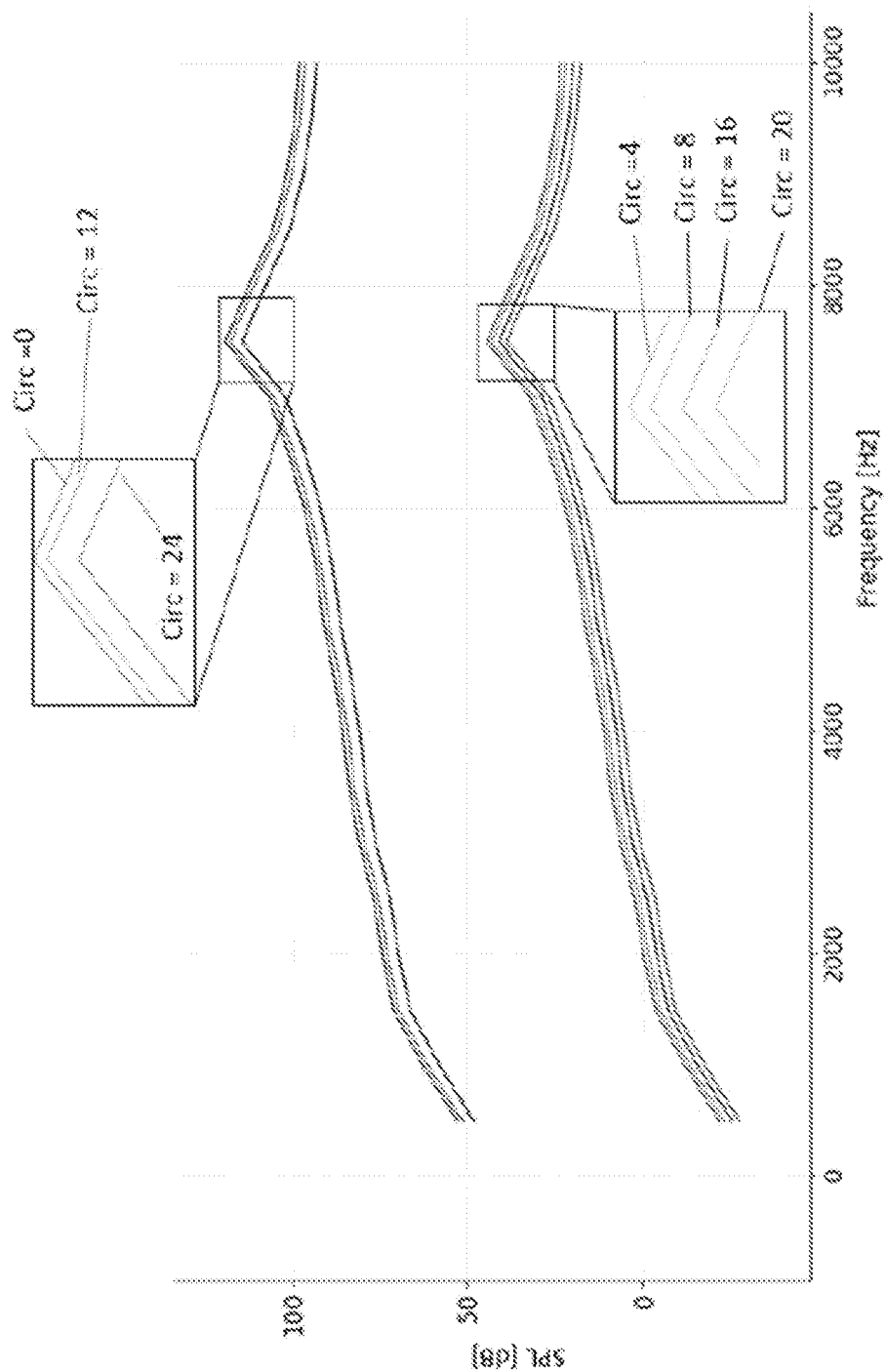
FIG. 9 shows a plot of the sound pressure levels from vibration mode zero at different frequencies for an example switched reluctance machine with 18 stator poles and 12 rotor poles including excitation caused by higher circumferential modes due to the sampling effect.

FIG. 9 shows a plot of the sound pressure level (SPL) generated by vibration mode zero of a switched reluctance machine with twelve stator poles and sixteen rotor poles. The plot shown in FIG. 9 illustrates the sound pressure level generated for a range of different frequencies when the sampling effect of higher-circumferential-orders is considered. For the plot shown in FIG. 9, the magnitudes of the different circumferential-order radial force density harmonics are the same.

The natural frequency of vibration mode zero is at 7636.5 Hz. As shown in the plot of FIG. 9, the natural frequency of vibration mode zero corresponds to the maximum SPL for each circumferential order plotted. As shown in the plot of FIG. 9, the radial force harmonics associated with circumferential modes twelve and twenty-four contribute to the vibration of mode zero due to the sampling effect. These higher-order circumferential modes excite vibration mode zero in a manner analogous to the circumferential mode zero of the radial forces.

FIG. 9 also shows that circumferential mode four also excites mode zero and causes a small sound pressure level due to forced excitation. Circumferential modes eight, sixteen, and twenty also contribute to sound pressure in a manner similar to mode four due to the sampling effect. While these modes may contribute less to the overall sound pressure level, they can still impact the overall acoustic noise level of the switched reluctance machine in a meaningful way at certain forcing frequencies.

As FIG. 9 illustrates, omitting the acoustic noise generated as a result of the sampling effect can lead to an underestimation of the acoustic noise level. Thus, by identifying the higher-circumferential order modes that impact the dominant circumferential modes of the switched reluctance machine due to the sampling effect, the sound pressure level for a given potential current waveform can be determined more accurately.

As noted above, the plurality of iteration-specific circumferential orders and the plurality of radial force harmonic magnitudes (as well as iteration-specific temporal orders) can be determined based on a radial force waveform for the switched reluctance machine.

The radial force waveform can be determined dynamically for the switched reluctance machine. For instance, the radial force waveform can be determined based on a motor speed and a DC link voltage of the switched reluctance machine. The radial force waveform can be determined using a dynamic motor drive model for the switched reluctance machine represented by sub-process 408.

In sub-process 408, a dynamic motor drive model can determine the radial force waveform for a given potential phase current waveform based on the current profile for that potential phase current waveform. The dynamic motor drive model can be defined to solve a phase voltage equation that calculates the radial force waveform dynamically while accounting for the voltage-dynamics of the switched reluctance machine for a given motor speed (i.e. the current operational motor speed) and DC link voltage. This dynamic motor drive model can account for the current tracking ability of the SRM drive when determining the radial force waveform.

The dynamic motor drive model can be configured to determine the radial force waveform based on the electromagnetic characteristics of the switched reluctance machine. Static electromagnetic characteristics of the switched reluctance machine can be determined during the pre-processing phase 420, e.g. using sub-process 407.

Sub-process 407 can be defined to determine the static electromagnetic characteristics of the switched reluctance machine using the known geometry of the SRM. The SRM geometry includes a salient pole structure, which is an essential part of its torque production mechanism. As a result, electromagnetic characteristics such as flux linkage and torque are functions of rotor position. Radial forces result from radial and tangential airgap flux densities and are thus functions of the spatial position of the SRM.

These characteristics are also dependent on the phase current waveform applied to the SRM. When the electrical coils of a given phase of the SRM are energized with current, the majority of the generated flux links with the electrical coils of the same phase. The SRM typically has a negligible mutual flux linkage. Accordingly, once the electromagnetic characteristics for one phase of an SRM are determined, they can be applied to the other phases of the SRM as well.

In sub-process 407, the electromagnetic characteristics of one phase of an SRM can be determined using electromagnetic finite element analysis (FEA) of the SRM. A plurality of constant currents can be applied to one phase of the SRM for one electrical cycle. Values of the flux linkage, torque, voltage, radial and tangential magnetic flux densities, and radial forces can be determined as a function of the excitation current and rotor position through the electromagnetic FEA. The radial and tangential magnetic flux densities and radial forces are also functions of the spatial position in the airgap.

These values of the electromagnetic characteristics can be stored in a non-transitory storage memory such as memory 114. For example, the values of the electromagnetic characteristics can be stored as look-up tables that are indexed based on operational parameters such as the excitation current (e.g. the potential current waveform), rotor position and spatial position in the airgap.

In sub-process 407, an electromagnetic FEA model can be generated automatically for the given SRM geometry, pole configuration, winding layout, and core material. The model can be 2- or 3-dimensional, depending on the particular application. The electromagnetic characteristics may be calculated with or without considering the mutual coupling effect, regardless of whether the FEA model is 2- or 3-dimensional.

The values of the electromagnetic characteristics determined in sub-process 407 may be nonlinear. The magnetic characteristics of an SRM are often strongly dependent on the properties of electrical steel. For a given electrical steel, the relationship between the magnetic field intensity and magnetic flux density is typically nonlinear, resulting in nonlinear electromagnetic characteristics for the SRM.

Referring again to sub-process 408, the radial force waveform can be determined by the dynamic motor drive model 408 using the stored values of the electromagnetic characteristics (e.g. determined by sub-process 407). The radial force waveform can be determined dynamically based on the real-time operational parameters of the SRM and the potential current waveform.

The dynamic motor drive model 408 can also determine the dynamic torque and torque ripple using the stored values of the electromagnetic characteristics. The dynamic torque and torque ripple can also be determined dynamically based on the real-time operational parameters of the SRM and the potential current waveform. As noted above, the dynamic torque and torque ripple calculated from the dynamic motor drive model in sub-process 408 can be used as part of an iterative optimization process used to determine the desired phase current waveform (e.g. as part of method 200 described herein above).

In sub-process 408, an SRM phase voltage equation can be solved dynamically using inverted flux linkage characteristics according to:

$$v_{ph} = R_{ph}i_{ph} + \frac{d\lambda_{ph}(i_{ph}, \theta_{elec})}{dt}$$

where $v_{ph}$ represents phase voltage, $R_{ph}$ represents phase resistance, $i_{ph}$ represents phase current, $\lambda_{ph}$ represents phase flux linkage, and $\theta_{elec}$ represents the electrical position of the phase.

Typically, calculating the phase current involves applying the conduction angles to a current controller to regulate the phase current within the given conduction angles for the given phase current reference (i.e. the current profile of the phase current waveform).

Referring again to sub-process 408, in order to determine the current waveforms in an offline process, for the calculated switching conditions of an asymmetric bridge converter, the phase voltage is used to solve the differential equation. To track the current waveform, the corresponding current reference can be applied to the current controller.

Once the phase current waveform is determined (offline), it can be used to identify the corresponding stored values of the torque, tangential and radial magnetic flux densities, and radial forces to determine the dynamic waveforms for these quantities. The radial force waveforms can be calculated from the radial forces using the Maxwell Stress Tensor method using the tangential and radial magnetic flux densities.

Alternatively, sub-process 408 can also be used as part of a real-time determination of the desired phase current waveforms. In such cases, the phase current output by 408 can be replaced with the measured phase current waveforms. The measured phase current waveforms can be used as a feedback signal when determining the phase current waveform.

Figure 15:
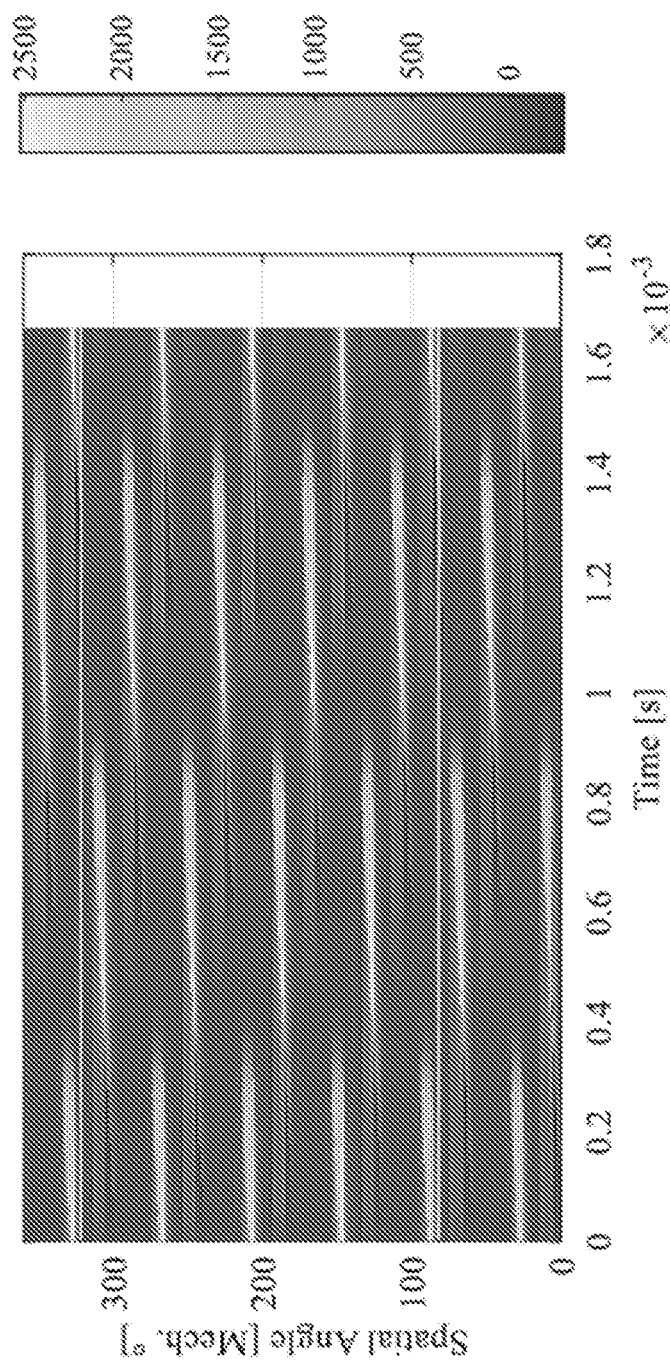
FIG. 15 shows an example plot of a radial force density waveform determined for one electrical cycle of a switched reluctance machine using an example dynamic motor drive model.

FIG. 15 shows an example radial force density waveform determined using an example dynamic motor drive model for one electrical cycle. The example radial force density waveform shown in FIG. 15 was calculated with Maxwell Stress Tensor method using the tangential and radial magnetic flux densities.

Referring again to FIG. 3, at 330 a plurality of iteration-specific forcing frequencies associated with the iteration-specific potential phase current waveform can be determined. Although 310, 320 and 330 are shown as separate steps, the plurality of iteration-specific circumferential orders, the plurality of radial force harmonic magnitudes, and the plurality of iteration-specific forcing frequencies can be determined concurrently The sound pressure levels resulting from applying a given current waveform to the switched reluctance machine can be determined as a function of frequency. The frequency of the radial force harmonics resulting from a given current waveform are related to the temporal order and motor speed. Accordingly, the plurality of iteration-specific forcing frequencies (for the corresponding iteration-specific potential current waveform) can be determined based on the motor speed of the SRM and a plurality of iteration-specific temporal orders.

For example, the plurality of iteration-specific forcing frequencies can be determined in sub-process 410 by calculating the frequency of the radial force harmonics for the iteration-specific temporal orders.

In order to determine the plurality of iteration-specific forcing frequencies, the plurality of iteration-specific temporal orders associated with the iteration-specific potential phase current waveform can be determined. The radial force waveform associated with the iteration-specific potential phase current waveform can be determined (e.g. in sub-process 408 as described above). The plurality of iteration-specific temporal orders can then be calculated by applying a fast Fourier transform to the radial force waveform as described above in relation to sub-process 409. For example, the iteration-specific temporal orders can be determined concurrently with the plurality of iteration-specific circumferential orders and the plurality of radial force harmonic magnitudes in sub-process 409.

Applying a fast Fourier transform to the radial force waveform can result in identifying all of the temporal orders associated with the radial force waveform. Optionally, the plurality of iteration-specific forcing frequencies can be determined based on a subset of the iteration-specific temporal orders that includes only dominant temporal orders for the switched reluctance machine. That is, a subset of dominant iteration-specific temporal orders can be determined from the iteration-specific temporal orders by identifying those temporal orders determined by applying the two-dimensional Fourier transform to the radial force waveform that are also identified as dominant temporal orders for the switched reluctance machine.

Similar to the circumferential orders discussed above, due to the pole configuration, number of phases, and number of poles, certain temporal orders contribute to the acoustic noise and vibration more than others. From a computational perspective, it is often not efficient to evaluate all possible temporal orders for the switched reluctance machine. Accordingly, the dominant temporal orders can be determined during the pre-processing phase. This can allow for a more efficient evaluation of the predicted acoustic noise levels associated with a potential current waveform with minimal impact on the accuracy of the prediction.

The dominant temporal orders can be determined in sub-process 403 of the pre-processing phase 420. A plurality of dominant temporal orders can be determined for the switched reluctance machine based on the pole configuration (e.g. from 401) and geometry (e.g. from 402) of the switched reluctance machine.

The plurality of dominant temporal orders can be determined based on the number of strokes in one mechanical revolution of the switched reluctance machine. The number of strokes can be identified as a product of a number of rotor poles (Nr) of the switched reluctance machine and a number of phases (m) of the switched reluctance machine. The particular manner in which the dominant temporal orders are identified depends on the structure of the particular switched reluctance machine.

The difference between dominant temporal orders in an SRM is related to the number of strokes. Therefore, the dominant temporal orders can be determined as a function of the number of strokes and an arbitrary integer, j. The dominant temporal orders are also related to other factors, such as the direction of rotation-either clockwise (CW) or counter-clockwise (CCW), whether the SRM is an interior (IR) or an exterior rotor (ER) motor, and the pole configuration. These factors change the position of the temporal orders with respect to the dominant circumferential orders. The impact of these factors to the dominant temporal orders is also related to the integer, i which can be used to define the dominant circumferential orders as noted above.

For the stator of an interior rotor SRM, where the number of stator poles, Ns is greater than number of rotor poles, Nr, and where the rotor rotates in a counter clockwise direction, the dominant temporal orders can be calculated according to:

$$u = mN_r j + N_r i$$

For the stator of an interior rotor SRM, where number of stator poles, Ns is greater than number of rotor poles, Nr, and where the rotor rotates in a clockwise direction, the dominant temporal orders can be calculated according to:

$$u = mN_r j - N_r i$$

For the stator of an interior rotor SRM, where number of stator poles, Ns is smaller than number of rotor poles, Nr, and where the rotor rotates in counter clockwise direction, the dominant temporal orders can be calculated according to:

$$u = mN_r j - N_r i$$

For the stator of an interior rotor SRM, where number of stator poles, Ns is smaller than number of rotor poles, Nr, and where the rotor rotates in clockwise direction, the dominant temporal orders can be calculated according to:

$$u = mN_r j + N_r i$$

For the rotor of an exterior rotor SRM, where number of stator poles, Ns is greater than number of rotor poles, Nr, and where the rotor rotates in counter clockwise direction, the dominant temporal orders can be calculated according to:

$$u = mN_r j + N_s i$$

For the rotor of an exterior rotor SRM, where number of stator poles, Ns is greater than number of rotor poles, Nr, and where the rotor rotates in clockwise direction, the dominant temporal orders can be calculated according to:

$$u = mN_r j - N_s i$$

For the rotor of an exterior rotor SRM, where number of stator poles, Ns is smaller than number of rotor poles, Nr, and where the rotor rotates in counter clockwise direction, the dominant temporal orders can be calculated according to:

$$u = mN_r j - N_s i$$

For the rotor of an exterior rotor SRM, where number of stator poles, Ns is smaller than number of rotor poles, Nr, and where the rotor rotates in clockwise direction, the dominant temporal orders can be calculated according to:

$$u = mN_r j + N_s i$$

Referring to FIG. 16, shown therein is an example plot of the radial force harmonics in a u-v plane for the dominant circumferential modes and dominant temporal orders associated with a switched reluctance machine having 18 stator poles and 12 rotor poles. The plot shown in FIG. 16 is the result of applying a two-dimensional fast Fourier Transform to the radial force density waveform for the switched reluctance machine. The plot shown in FIG. 16 illustrates the magnitudes of the radial force density harmonics for the dominant circumferential and temporal orders.

In FIG. 16, the circumferential axis and temporal axis include positive and negative values. The circumferential-temporal plane shown in FIG. 16 can be divided into four quadrants centered at (0,0), namely a first quadrant (top right quadrant) that includes positive circumferential values and positive temporal values; a second quadrant (top left quadrant) that includes negative circumferential values and positive temporal values; a third quadrant (bottom left quadrant) that includes negative circumferential values and negative temporal values; and a fourth quadrant (bottom right quadrant), positive circumferential values and negative temporal values.

As the plot in FIG. 16 illustrates, the radial force harmonics are symmetric in the four quadrants of the u-v plane. FIG. 17 shows an example plot of the radial force harmonics in the first quadrant of the u-v plane for the dominant circumferential modes and dominant temporal orders associated with the switched reluctance machine having 18 stator poles and 12 rotor poles plotted in FIG. 16.

Referring again to FIG. 3, at 340 the cumulative sound pressure level can be determined for the iteration-specific potential phase current waveform. The cumulative sound pressure level can be determined using the plurality of iteration-specific circumferential orders (from 310), the plurality of iteration-specific forcing frequencies (from 330) and the plurality of radial force harmonic magnitudes (from 320).

The cumulative sound pressure level can be determined by combining a plurality of iteration-specific harmonic sound pressure levels. Each iteration-specific harmonic sound pressure level can be determined based on a combination of one of the iteration-specific circumferential orders, one of the iteration-specific forcing frequencies and one of the radial force harmonic magnitudes. The iteration-specific harmonic sound pressure levels can be determined based on simulated sound pressure levels associated with particular circumferential orders and particular forcing frequencies.

For example, in sub-process 411 the plurality of iteration-specific harmonic sound pressure levels can be determined for the iteration-specific circumferential orders at different iteration-specific forcing frequencies using the associated radial force harmonic magnitudes and simulated sound pressure levels associated with the particular combination of circumferential orders and forcing frequencies.

For example, simulated sound pressure levels associated with particular circumferential orders and particular forcing frequencies can be determined during the pre-processing phase 420 in sub-process 406. The simulated sound pressure levels can be stored in a non-transitory storage memory such as memory 114. The simulated sound pressure levels can be accessed during the operational processes 415 and used to determine the cumulative sound pressure level. For example, the simulated sound pressure levels can be stored as look-up tables that are indexed based on the corresponding circumferential orders and forcing frequencies. This can facilitate determining the harmonic sound pressure levels for a potential current waveform dynamically in sub-process 411.

The simulated sound pressure levels can be determined using a unit force value. Accordingly, the harmonic sound pressure levels for a potential current waveform can be determined by applying the respective radial force harmonic magnitudes to the stored values of the simulated sound pressure levels.

The stored values of the sound pressure levels can be determined for the dominant circumferential modes of the SRM as a function of frequency. In order to determine the simulated sound pressure levels for a given switched reluctance machine, the dominant model properties of the SRM can be characterized. In sub-process 404, the geometry of the switched reluctance motor (from sub-process 402) can be used to characterize the dominant modal properties. For example, the dominant modal properties can be characterized through vibroacoustic finite element analysis of the switched reluctance machine.

In a switched reluctance machine, sound pressure is generated when the radial forces excite the mode shapes of the motor structure. The vibration is stronger when the forcing frequency of the radial force waveform coincides with the natural frequency of a vibration mode that has the same shape as that radial force harmonics. This causes resonance. Accordingly, the natural frequency of the vibration mode shape of the SRM will impact how a given current waveform affects the sound pressure level of the SRM.

In sub-process 404, the SRM geometry and structure can be modeled using vibroacoustic FEA software with boundary conditions. The vibroacoustic FEA can model the SRM to identify the vibration modes of the SRM that correspond to the dominant circumferential orders of the SRM (e.g. from sub-process 403).

The vibroacoustic FEA can generate a set of natural frequencies for different mode shapes through a modal analysis of the SRM. The displacement on the motor surface for each mode shape can be identified. The displacements can be determined around the stator circumference.

A displacement distribution for the dominant circumferential modes (from 403) can be calculated analytically for a cylindrical shell (a cylinder with a hollow center portion). These analytically calculated displacements are also determined around the stator circumference (as represented by the cylindrical shell).

The surface displacements determined based on the geometry and structure of the SRM (e.g. from the vibroacoustic FEA) can then be compared with the displacements calculated for the cylindrical shell using the dominant circumferential modes. A modal correlation coefficient can be calculated based on the comparison in order to identify the natural frequencies of the dominant circumferential modes. For each dominant circumferential mode, a natural frequency associated with that dominant circumferential mode can be identified through this modal analysis.

Figure 5:
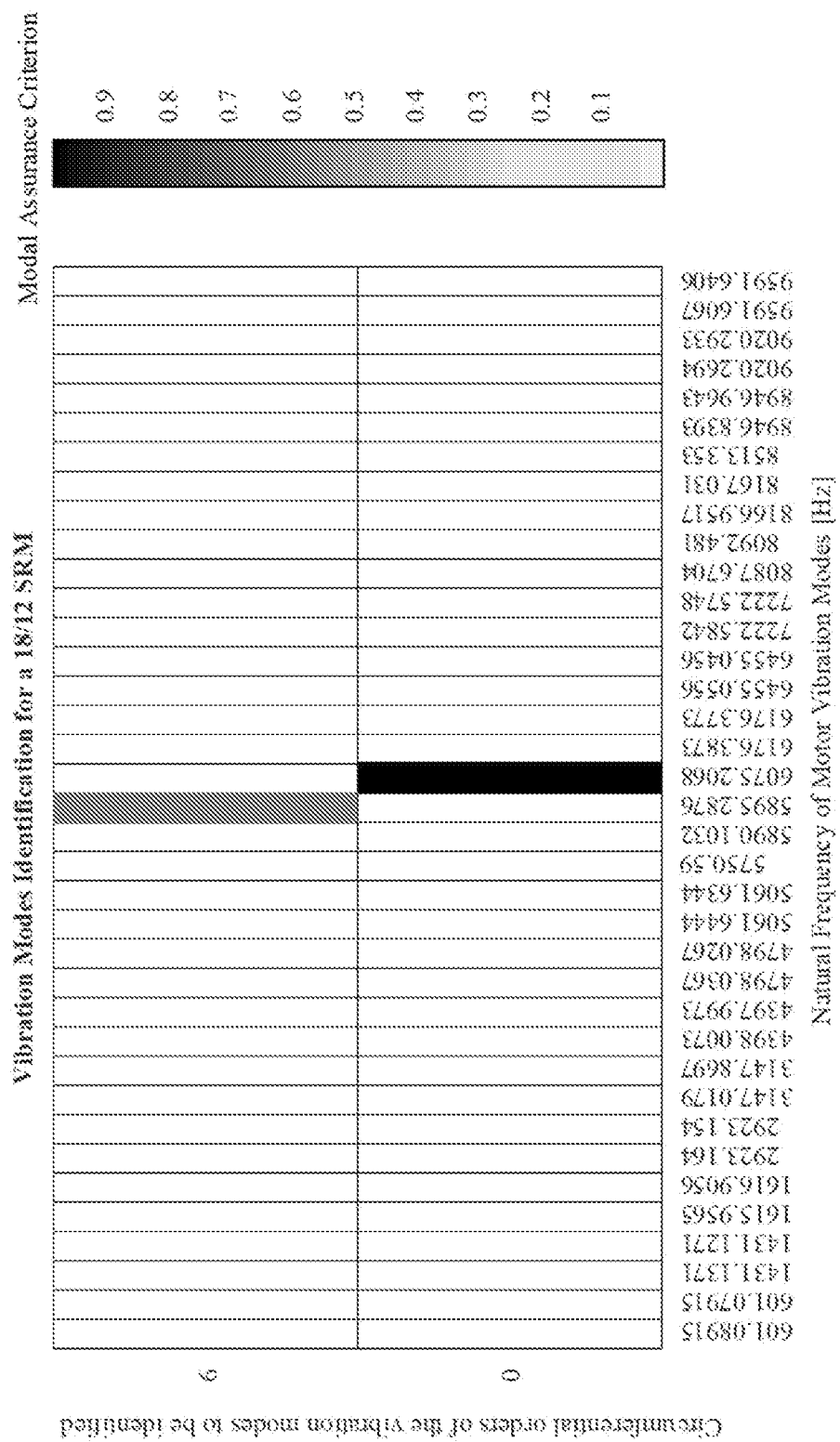
FIG. 5 shows a plot of the natural frequencies identified for vibration modes zero and six in an example switched reluctance machine with 18 stator poles and 12 rotor poles.

Referring now to FIG. 5, shown therein is an example plot of the circumferential orders of the vibration modes and associated natural frequencies determined for a switched reluctance machine with 18 stator poles and 12 rotor poles. The plot shown in FIG. 5 illustrates the natural frequencies for circumferential mode zero and circumferential mode six for the SRM with 18 stator poles and 12 rotor poles.

Figure 6:
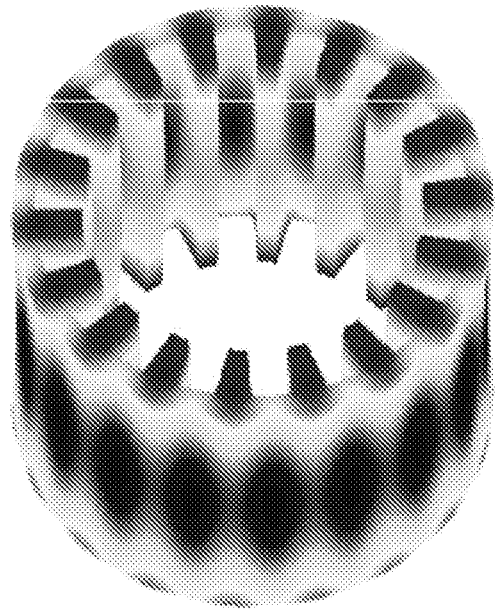
FIG. 6 illustrates an example plot of surface displacement from vibration mode zero on the example switched reluctance machine with 18 stator poles and 12 rotor poles.

FIG. 6 shows an example plot of the surface displacement for vibration mode zero of the SRM with 18 stator poles and 12 rotor poles from FIG. 5. The plot in FIG. 6 shows an example shape for a dominant vibration mode of the SRM, in this case vibration mode zero. As shown in FIG. 6, the natural frequency for circumferential mode zero was identified at 6075 Hz.

Figure 7:
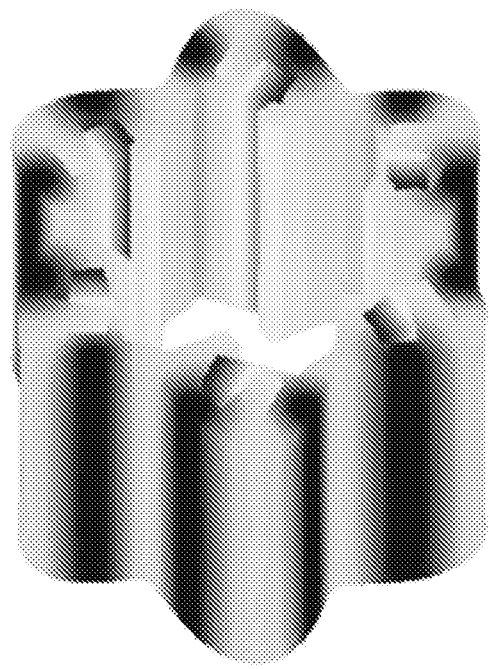
FIG. 7 illustrates an example plot of surface displacement from vibration mode six plotted on the example switched reluctance machine with 18 stator poles and 12 rotor poles.

FIG. 7 shows an example plot of the surface displacement for vibration mode six of the SRM with 18 stator poles and 12 rotor poles from FIG. 5. The plot in FIG. 7 shows an example shape for a dominant vibration mode of the SRM, in this case vibration mode six. As shown in FIG. 7, the natural frequency for circumferential mode zero was identified at 5895 Hz.

The simulated sound pressure levels associated with a given circumferential mode can also be determined using vibroacoustic model of the switched reluctance machine. In sub-process 406, the simulated sound pressure levels associated with a given circumferential mode can be determined by simulating a resultant sound pressure level corresponding to at least one frequency value proximate to the natural frequency (determined from 404). The simulated sound pressure levels can then be stored for use during the operational processes 415 used to determine the cumulative sound pressure level.

The simulated sound pressure levels associated with a given circumferential order and forcing frequency can be defined using unit forces. Unit forces can be applied to the vibroacoustic model (from 404) of the given motor structure to determine the simulated sound pressure level that results from a particular combination of circumferential order and forcing frequency. When determining the harmonic sound pressure level for a potential waveform (i.e. at 340), the radial force harmonic magnitude associated with the particular combination of circumferential order and forcing frequency can be applied to the sound pressure level that was simulated using unit forces to determine the predicted sound pressure level for the potential waveform.

Figure 10:
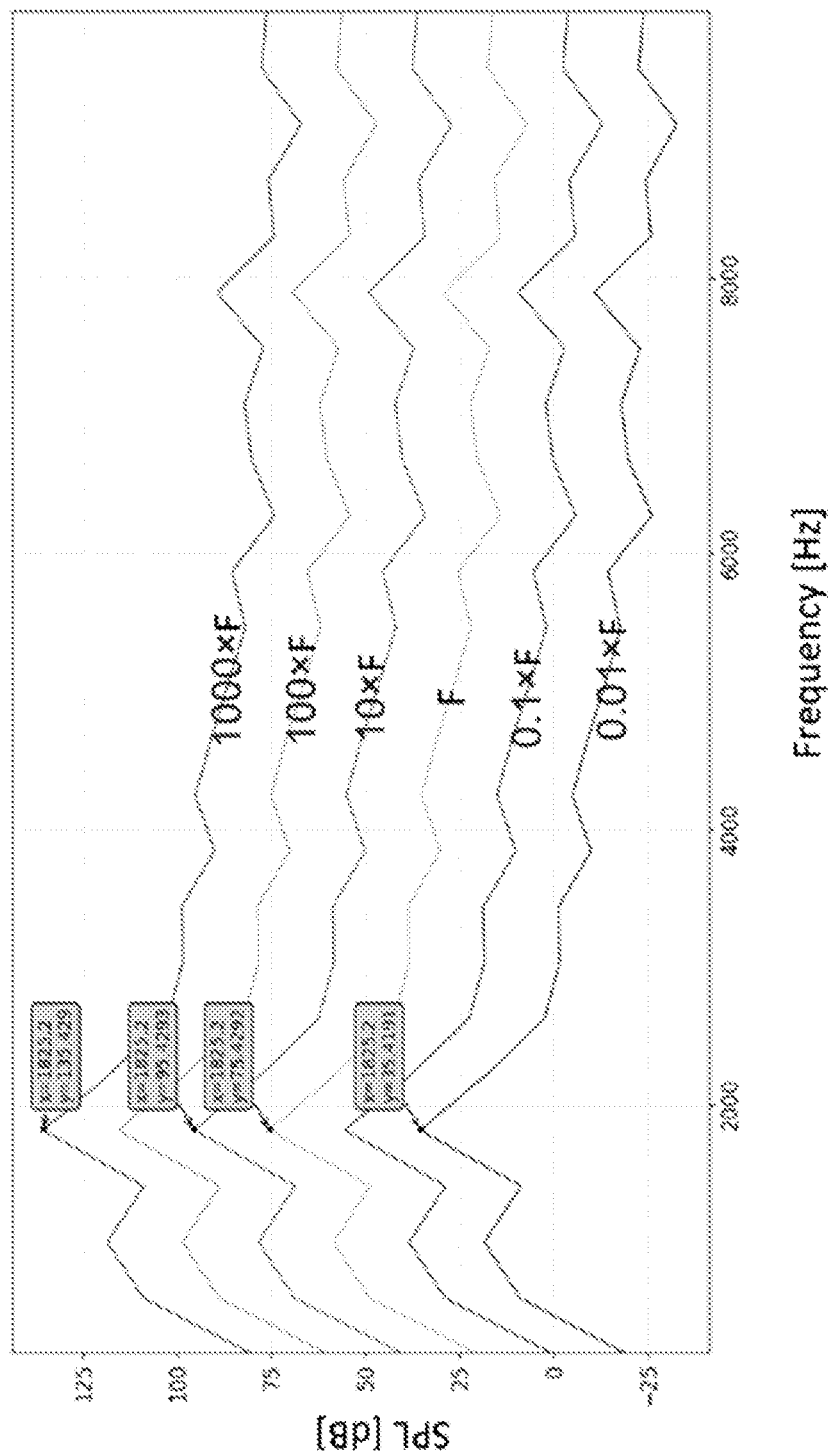
FIG. 10 shows an example plot of sound pressure levels for a simulated switched reluctance machine when different force magnitudes are applied.

FIG. 10 shows an example plot of simulated sound pressure levels determined for a range of frequencies. The simulated sound pressure levels were determined through a vibroacoustic FEA simulation of an SRM at a certain speed.

In the plots shown in FIG. 10, a plurality of simulated sound pressure levels are shown corresponding to a plurality of different radial force harmonic magnitudes. As FIG. 10 illustrates, the sound pressure level increases by about 40 dB when the magnitude of radial forces increases 100 times.

The sound pressure level and radial force harmonic magnitude are related through the relationship between displacement, sound power, and sound pressure level. If the force magnitude is increased by n times, the displacement increases by n times, as displacement can be directly correlated with the force magnitude according to:

$$D_{(q,circ,ax)} = \frac{F_{r(q,circ,ax)}/M}{\sqrt{\left(w_{n(q,circ,ax)}^2 - w_{f(q,circ,ax)}^2\right)^2 + 4\zeta_{(q,circ,ax)}^2 w_{f(q,circ,ax)}^2 w_{n(q,circ,ax)}^2}}$$

Sound power can also increase by $n^2$ times, as sound power can be related to the square of displacement according to:

$$\pi_{(q,circ,ax)} = \rho_0 c_0 \left(\frac{wD_{(q,circ,ax)}}{\sqrt{2}}\right)^2 \sigma_{(q,circ,ax)} A_s \quad [W]$$

The sound power level after increasing the force magnitude by n times can be determined by:

$$SWL_{(q)} = 10 \lg \frac{\hat{\pi}(q)}{\pi_{ref}} \quad [dB]$$

$$SPL_{(q)} = SWL_{(q)} - 10 \log_{10}\left\{2\pi\left[1 + \frac{\max(l_{shell}, 2r_{shell})}{2}\right]^2\right\} \quad [dB]$$

The sound pressure level can, in turn, be determined according to:

$$SPL_2 = SPL_1 + 20 \log(n)$$

The plots shown in FIG. 10 illustrate that even when the magnitude of the force is increased by 100 times, the relationship holds. In the plot shown in FIG. 10, when the forces are reduced by 100 times, the simulated SPL was determined to be around 35 dB. When the forces were increased by 1000 times, the simulated SPL was determined to be around 135 dB. According to the above expressions, a 100 dB increase in SPL would be expected, which corresponds to the increase determined by the vibroacoustic FEA simulations shown in FIG. 10.

The simulated sound pressure levels associated with a given circumferential mode can be determined by simulating a plurality of resultant sound pressure levels corresponding to a plurality of frequency values proximate to the natural frequency. That is, multiple frequency values may be simulated around the natural frequency for each circumferential mode. The frequency values that are simulated for each circumferential order can be mainly concentrated around the natural frequency of the corresponding mode shape (from 404). As the motor is more prone to vibration around a natural frequency, this can provide a better estimation of the SPL level when radial forces are applied due to dynamic phase current.

For each frequency value analyzed sub-process 406, the acoustic near and far field meshing can be adjusted in the vibroacoustic FEA to maintain simulation accuracy and reduce computation time. The thickness of the near field and element size for each frequency simulated can defined based on the wavelength at that frequency.

Figure 11:
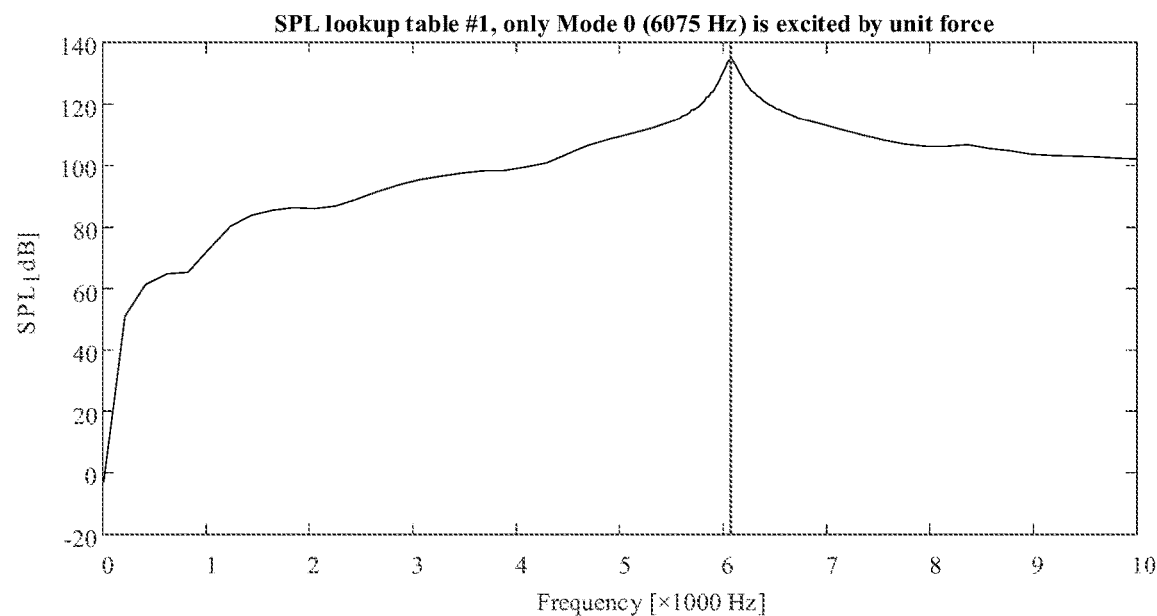
FIG. 11 shows an example plot of sound pressure levels of vibration mode zero for a range of frequencies in an example switched reluctance machine with 18 stator poles and 12 rotor poles when a unit force is applied.

FIG. 11 illustrates an example plot of simulated sound pressure levels for circumferential mode zero of a switched reluctance machine with 18 stator poles and 12 rotor poles. The plot shown in FIG. 11 shows the simulated sound pressure levels when a unit force is applied. These simulated sound pressure levels can be stored (e.g. in a look-up table) for use in determining the harmonic sound pressure levels for a given phase current waveform during the operational phase 415.

Figure 12:
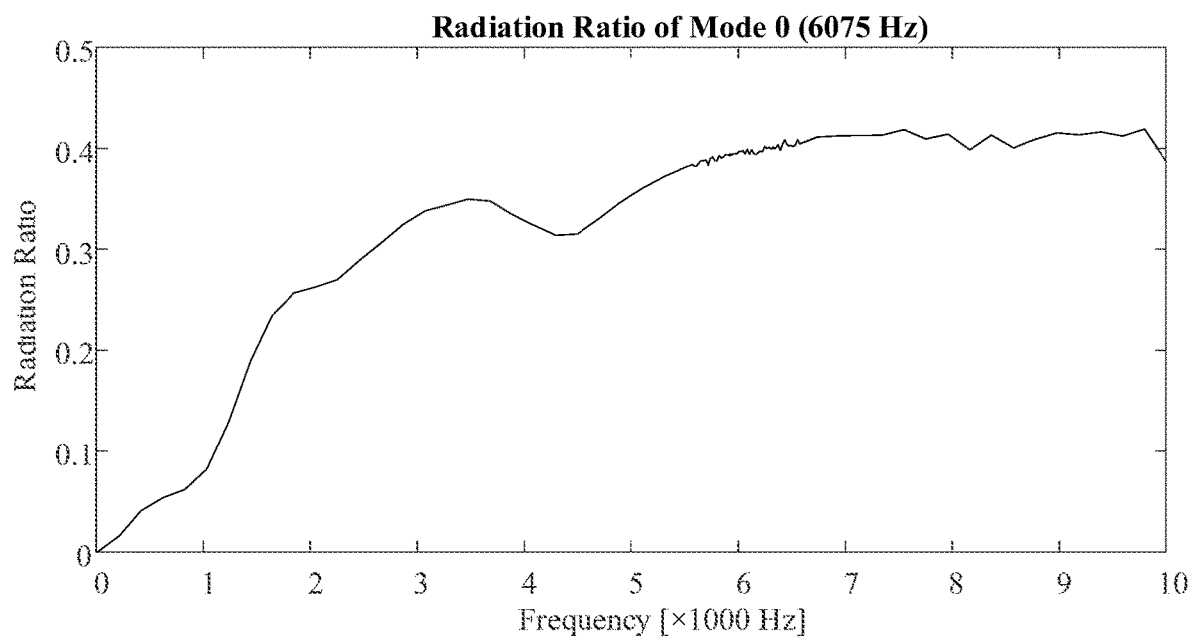
FIG. 12 shows an example plot of the acoustic radiation ratio of vibration mode zero for a range of frequencies in an example switched reluctance machine with 18 stator poles and 12 rotor poles.

FIG. 12 illustrates an example plot of the radiation ratio of circumferential mode zero for the switched reluctance machine with 18 stator poles and 12 rotor poles. The radiation ratio can also be generated using a vibroacoustic simulation of the switched reluctance machine.

Figure 13:
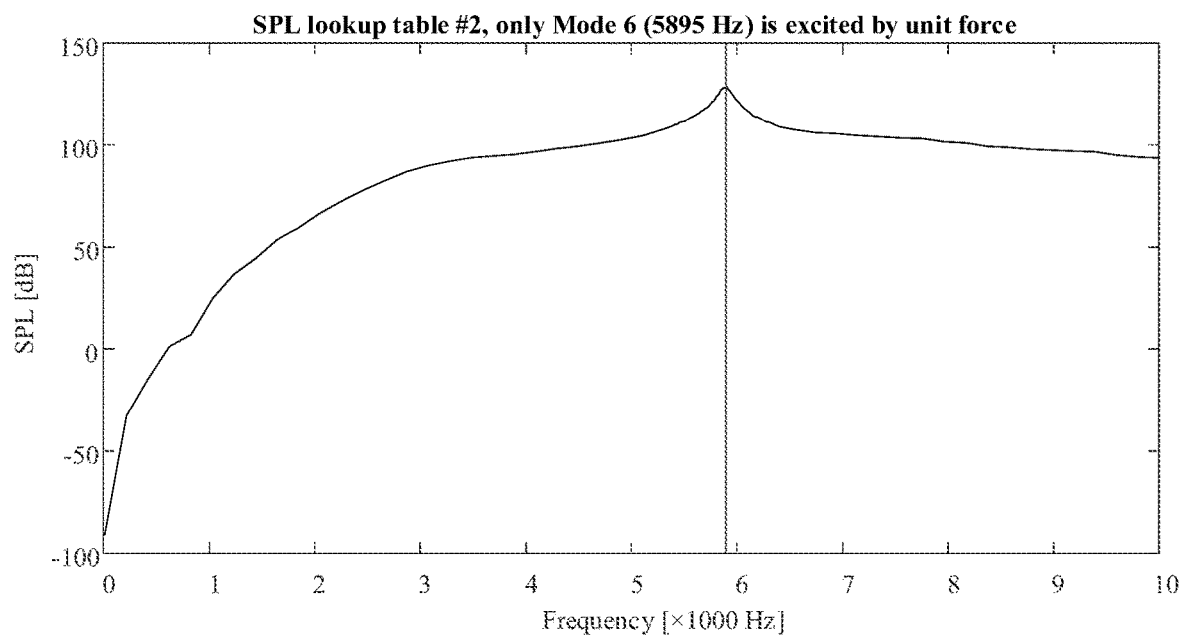
FIG. 13 shows an example plot of sound pressure levels of vibration mode six for a range of frequencies in an example switched reluctance machine with 18 stator poles and 12 rotor poles when a unit force is applied.

FIG. 13 illustrates an example plot of simulated sound pressure levels for circumferential mode six of the switched reluctance machine with 18 stator poles and 12 rotor poles. The plot shown in FIG. 13 shows the simulated sound pressure levels when a unit force is applied. These simulated sound pressure levels can be stored (e.g. in a look-up table) for use in determining the harmonic sound pressure levels for a given phase current waveform during the operational phase 415.

Figure 14:
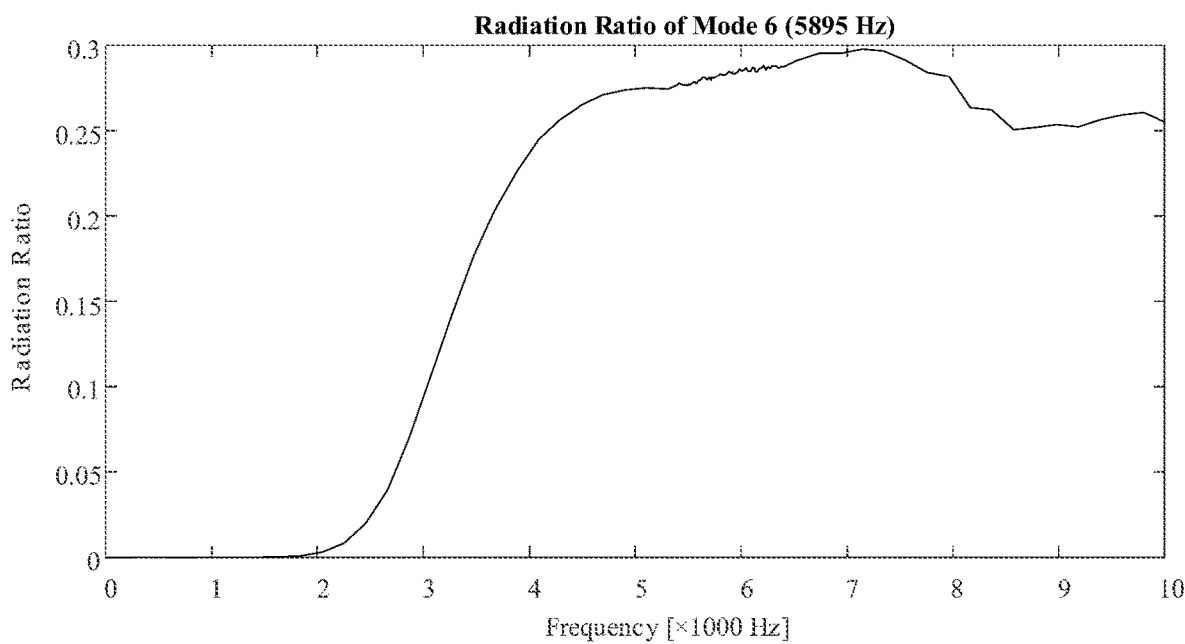
FIG. 14 shows an example plot of the acoustic radiation ratio of vibration mode six for a range of frequencies in an example switched reluctance machine with 18 stator poles and 12 rotor poles.

FIG. 14 illustrates an example plot of the radiation ratio of circumferential mode six for the switched reluctance machine with 18 stator poles and 12 rotor poles. The radiation ratio can also be generated using a vibroacoustic simulation of the switched reluctance machine.

As can be seen from the plots in FIG. 11-14, the sound pressure level and radiation ratio are both dependent on the circumferential order and frequency. Simulated sound pressure levels such as those shown in FIGS. 11 and 13 can be used in sub-process 411 to dynamically determine the harmonic sound pressure levels for potential phase current waveforms (e.g. at 340).

The simulated sound pressure levels generated through an implementation of the methods described herein were compared to sound pressure levels generated through vibroacoustic FEA simulations with dynamic nodal force.

FIG. 18 shows a comparison of the sound pressure levels generated for circumferential modes zero and six through an implementation of the methods described herein (i.e. using sub-process 406) with the sound pressure levels calculated by applying a dynamic current calculated through sub-process 408 directly to the electromagnetic FEA model of the SRM. Nodal forces were calculated using the electromagnetic FEA model of the SRM and those nodal forces were directly applied to the vibroacoustic FEA model of the SRM to calculate the sound pressure level for the same modes. As shown in FIG. 18, the sound pressure levels calculating using the implementation of sub-process 406 match closely with the sound pressure levels calculated directly from the electromagnetic and vibroacoustic FEA models using dynamic current values.

As described herein above, the sub-processes in the pre-processing phase 420 can be used to control the current applied to a switched reluctance motor drive for acoustic noise reduction. In particular, the pre-processing phase 420 has been described in the context of determining simulated sound pressure levels and electromagnetic characteristics for a switched reluctance machine with a defined geometry and pole configuration. However, the sub-processes 401-407 in the pre-processing phase 420 can also be applied in the design of the motor geometry and assembly in order to provide a switched reluctance machine that enables further acoustic noise reduction.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A system comprising:
a switched reluctance machine comprising:
    a shaft;
    a rotor mounted to the shaft, the rotor having a plurality of salient rotor poles;
    a stator having a plurality of salient stator poles protruding from the stator towards the rotor poles; and
    a plurality of electrical coils wound about the stator poles, the plurality of electrical coils including a plurality of separate phase coils defining a plurality of phases of the switched reluctance machine;
a power source;
a power converter coupled to the power source and to the switched reluctance machine; and
a controller;
wherein the controller is configured to:
    determine a plurality of potential phase current waveforms for a corresponding phase coil of the switched reluctance machine;
    for each potential phase current waveform, determine a cumulative sound pressure level of the switched reluctance machine, the cumulative sound pressure level determined based on a plurality of harmonic sound pressure levels expected to result from the potential phase current waveform;
    identify a desired phase current waveform as the potential phase current waveform associated with an optimal cumulative sound pressure level; and
    apply the desired phase current waveform to the corresponding phase coil of the switched reluctance machine using the power converter.

2. The system of claim 1, wherein the controller is configured to determine the desired phase current waveform using an iterative optimization process wherein each iteration of the iterative optimization process comprises:
    identifying an iteration-specific potential phase current waveform;
    determining a plurality of iteration-specific circumferential orders associated with the iteration-specific potential phase current waveform;
    determining a plurality of radial force harmonic magnitudes associated with the iteration-specific potential phase current waveform;
    determining a plurality of iteration-specific forcing frequencies associated with the iteration-specific potential phase current waveform; and
    determining the cumulative sound pressure level for the iteration-specific potential phase current waveform using the plurality of iteration-specific circumferential orders, the plurality of iteration-specific forcing frequencies and the plurality of radial force harmonic magnitudes.

3. The system of claim 2, wherein the controller is configured to determine the cumulative sound pressure level by:
    identifying a plurality of iteration-specific harmonic sound pressure levels, each iteration-specific harmonic sound pressure level determined based on a combination of one of the iteration-specific circumferential orders, one of the iteration-specific forcing frequencies and one of the radial force harmonic magnitudes;
    determining the cumulative sound pressure level as a sum of the plurality of iteration-specific harmonic sound pressure levels.

4. The system of claim 3, further comprising a non-transitory storage memory having stored therein a look-up table defined based on simulated sound pressure levels associated with particular circumferential orders and particular forcing frequencies, wherein the controller is configured to determine each iteration-specific harmonic sound pressure level using the look-up table.

5. The system of claim 4, wherein the look-up table is defined during a pre-processing phase, and the pre-processing phase comprises:
    determining a plurality of dominant circumferential modes for the switched reluctance machine based on a geometry and pole configuration of the switched reluctance machine;
    for each dominant circumferential mode,
        determining a natural frequency associated with that dominant circumferential mode;
        determining the simulated sound pressure levels associated with that dominant circumferential mode by simulating a resultant sound pressure level corresponding to at least one frequency value proximate to the natural frequency using a vibroacoustic model of the switched reluctance machine; and
        storing the simulated sound pressure levels in the look-up table in association with the corresponding dominant circumferential mode and frequency value.

6. The system of claim 5, wherein the plurality of dominant circumferential modes are determined by:
    identifying a number of magnetic poles of the switched reluctance machine as a ratio between a number of stator poles of the switched reluctance machine and a number of phases of the switched reluctance machine; and
    identifying the dominant circumferential modes as a function of the number of magnetic poles.

7. The system of claim 6, wherein for each dominant circumferential mode:
    higher-circumferential-order radial force harmonics that excite that dominant circumferential mode due to a sampling effect of the radial force density harmonics are identified; and
    the simulated sound pressure levels associated with that dominant circumferential mode are determined to include sound pressure resulting from the identified higher-circumferential-order radial force harmonics.

8. The system of claim 2, wherein the controller is configured to determine the plurality of iteration-specific forcing frequencies by:
    determining a motor speed of the switched reluctance machine;

determining a plurality of iteration-specific temporal orders associated with the iteration-specific potential phase current waveform; and determining the plurality of iteration-specific forcing frequencies based on the motor speed and the plurality of iteration-specific temporal orders.

9. The system of claim 8, wherein the controller is configured to determine the plurality of iteration-specific temporal orders by:

determining a radial force waveform associated with the iteration-specific potential phase current waveform; and calculating the plurality of iteration-specific temporal orders by applying a fast Fourier transform to the radial force waveform.

10. The system of claim 9, wherein the controller is configured to:

determine a plurality of dominant temporal orders;

determine a subset of dominant iteration-specific temporal orders corresponding to the plurality of dominant temporal orders; and determine the plurality of iteration-specific forcing frequencies based on the motor speed and the subset of dominant iteration-specific temporal orders.

11. The system of claim 10, wherein the plurality of dominant temporal orders are predetermined based on a geometry and pole configuration of the switched reluctance machine.

12. The system of claim 11, wherein the plurality of dominant temporal orders are predetermined by:

identifying a number of strokes in one mechanical revolution as a product of a number of rotor poles of the switched reluctance machine and a number of phases of the switched reluctance machine; and identifying the dominant temporal orders as a function of the number of strokes.

13. The system of claim 2, wherein the controller is configured to determine the plurality of iteration-specific circumferential orders by:

determining a radial force waveform associated with the iteration-specific potential phase current waveform; and calculating the plurality of iteration-specific circumferential orders by applying a fast Fourier transform to the radial force waveform.

14. The system of claim 2, wherein the controller is configured to determine the plurality of radial force harmonic magnitudes by:

determining a radial force waveform associated with the iteration-specific potential phase current waveform; and calculating the plurality of radial force harmonic magnitudes by applying a fast Fourier transform to the radial force waveform.

15. The system of claim 13, wherein the controller is configured to determine the plurality of iteration-specific circumferential orders and the plurality of radial force harmonic magnitudes concurrently by applying the fast Fourier transform to the radial force waveform.

16. The system of claim 13, wherein the controller is configured to determine the radial force waveform using a dynamic motor drive model based on a motor speed and a DC link voltage of the switched reluctance machine.

17. The system of claim 13, wherein the controller is configured to determine the radial force waveform based on a motor speed, phase voltages and phase currents of the switched reluctance machine.

* * * * *